(12) United States Patent
Cheong et al.

(10) Patent No.: US 11,191,116 B2
(45) Date of Patent: Nov. 30, 2021

(54) ELECTRONIC DEVICE FOR TRANSMITTING RESPONSE MESSAGE IN BLUETOOTH NETWORK ENVIRONMENT AND METHOD FOR THE SAME

(71) Applicant: Samsung Electronics Co., Ltd., Suwon-si (KR)

(72) Inventors: Gupil Cheong, Suwon-si (KR); Jesus Manuel Perez Pueyo, Suwon-si (KR); Soohye Shin, Suwon-si (KR); Sangho Lee, Suwon-si (KR); Gibeom Kim, Suwon-si (KR); Yunsik Bae, Suwon-si (KR); Sungjun Choi, Suwon-si (KR); Euibum Han, Suwon-si (KR); Doosuk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/809,866

(22) Filed: Mar. 5, 2020

(65) Prior Publication Data
US 2020/0288519 A1 Sep. 10, 2020

(30) Foreign Application Priority Data

Mar. 5, 2019 (KR) .................. 10-2019-0025336

(51) Int. Cl.
*H04W 88/04* (2009.01)
*H04W 76/14* (2018.01)
(Continued)

(52) U.S. Cl.
CPC ............. *H04W 76/14* (2018.02); *H04W 4/80* (2018.02); *H04W 84/18* (2013.01)

(58) Field of Classification Search
CPC .................................................... H04W 28/20
See application file for complete search history.

(56) References Cited

U.S. PATENT DOCUMENTS 6,791,996 B1 * 9/2004 Watanabe ............. H04W 74/02
370/347
9,712,266 B2 7/2017 Linde et al.
(Continued)

FOREIGN PATENT DOCUMENTS

WO 2018/074892 A1 4/2018

OTHER PUBLICATIONS

International Search Report dated Jun. 23, 2020, issued in International Patent Application No. PCT/KR2020/002952.

*Primary Examiner* — Cindy Trandai
(74) *Attorney, Agent, or Firm* — Jefferson IP Law, LLP

(57) ABSTRACT

An electronic device is provided. The electronic device includes wireless communication circuitry that supports a Bluetooth network, at least one processor, and a memory. The memory stores instructions that cause the at least one processor to create a link with an external electronic device based on the Bluetooth network, transmit a data packet including content to the external electronic device, through the wireless communication circuitry, identify whether the external electronic device supports a resource control function, receive at least one response message to the data packet through a first time resource, which is previously assigned, when the external electronic device does not support the resource control function, and receive a plurality of response messages to the data packet through a second time resource obtained by changing at least a portion of the first time resource, when the external electronic device supports the resource control function.

20 Claims, 17 Drawing Sheets

(51) Int. Cl.
 *H04W 4/80* (2018.01)
 *H04W 84/18* (2009.01)

(56) References Cited

U.S. PATENT DOCUMENTS

| | | |
|---|---|---|
| 9,924,304 B2 | 3/2018 | Yu et al. |
| 9,953,612 B2* | 4/2018 | Queen ................. H04L 12/2814 |
| 10,149,340 B1 | 12/2018 | Rabii et al. |
| 10,405,369 B2 | 9/2019 | Rabii et al. |
| 2007/0248038 A1* | 10/2007 | Yamasaki .............. H04B 7/022 |
| | | 370/328 |
| 2011/0013611 A1* | 1/2011 | Chou .................... H04W 24/00 |
| | | 370/338 |
| 2012/0289157 A1* | 11/2012 | Palin ....................... H04W 4/80 |
| | | 455/41.2 |
| 2013/0182798 A1* | 7/2013 | Lozano .................. H04W 4/18 |
| | | 375/340 |
| 2014/0348327 A1 | 11/2014 | Linde et al. |
| 2015/0124695 A1* | 5/2015 | Jafarian ............. H04B 7/15557 |
| | | 370/315 |
| 2015/0296468 A1 | 10/2015 | Dural et al. |
| 2016/0262193 A1* | 9/2016 | Hariharan ............... H04W 4/80 |
| 2017/0034647 A1* | 2/2017 | Takeuchi ............... H04W 76/40 |
| 2017/0208424 A1 | 7/2017 | Longjie et al. |
| 2017/0353979 A1* | 12/2017 | Lee ....................... H04W 88/04 |
| 2018/0352558 A1* | 12/2018 | Paycher ............ H04W 72/1205 |
| 2019/0075611 A1 | 3/2019 | Rabii et al. |
| 2019/0349718 A1 | 11/2019 | Kwon et al. |
| 2020/0162878 A1* | 5/2020 | Zhuang .................. H04W 4/06 |
| 2020/0196323 A1* | 6/2020 | Church .................. H04W 4/80 |
| 2020/0221336 A1* | 7/2020 | Goyal ................. H04W 12/033 |
| 2021/0029528 A1* | 1/2021 | Huang ................. H04W 8/005 |

\* cited by examiner

ELECTRONIC DEVICE FOR TRANSMITTING RESPONSE MESSAGE IN BLUETOOTH NETWORK ENVIRONMENT AND METHOD FOR THE SAME

CROSS-REFERENCE TO RELATED APPLICATION(S)

This application is based on and claims priority under 35 U.S.C. § 119(a) of a Korean patent application number 10-2019-0025336, filed on Mar. 5, 2019, in the Korean Intellectual Property Office, the disclosure of which is incorporated by reference herein in its entirety.

BACKGROUND

1. Field

The disclosure relates to an electronic device for transmitting a response message in a Bluetooth network environment and a method for the same.

2. Description of Related Art

The Bluetooth standard technology defined by Bluetooth Special Interest Group (SIG) defines a protocol for short-range wireless communication between electronic devices. In a Bluetooth network environment, electronic devices may transmit or receive data packets containing content, such as texts, voices, images, or videos, in a designated frequency band (e.g., about 2.4 gigahertz (GHz)).

For example, user equipment (UE), such as a smartphone, a tablet, a desktop computer, or a laptop computer, may transmit a data packet to another user terminal or an accessory device. The accessory device may include, for example, at least one of an earphone, a headset, a speaker, a mouse, a keyboard, or a display device.

The above information is presented as background information only to assist with an understanding of the disclosure. No determination has been made, and no assertion is made, as to whether any of the above might be applicable as prior art with regard to the disclosure.

SUMMARY

A topology representing a Bluetooth network environment may include one user device (e.g., device under test (DUT)) transmitting a data packet and a plurality of devices receiving the data packet from the user device. For example, when an earphone (or a headset) is connected with the smartphone, an earphone put on a user's left ear and an earphone put on a user's right ear may receive a data packet from the smartphone.

Unless a plurality of devices receiving the data packet are connected with each other in a wired manner, each of the plurality of devices receiving the data packet may form a separate link with the user device. In this case, the user device needs to create a plurality of links to transmit the data packet, so resources are consumed, power is consumed, and complexity is increased in the user device. In addition, as the number of devices to which the user device has to transmit data is increased, the power consumption is increased in the user device and time taken for data packets to reach the devices is increased.

Aspects of the disclosure are to address at least the above-mentioned problems and/or disadvantages and to provide at least the advantages described below. Accordingly, an aspect of the disclosure is to provide an electronic device to solve the problem in a Bluetooth Network and a method for the same.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuitry to support a Bluetooth network, at least one processor operatively connected with the wireless communication circuitry, and a memory operatively connected with the at least one processor. The memory may store instructions that, when executed, cause the at least one processor to create a link with an external electronic device based on the Bluetooth network through the wireless communication circuitry, transmit a data packet including content to the external electronic device, through the wireless communication circuitry, identify whether the external electronic device supports a resource control function, receive at least one response message to the data packet through a first time resource, which is previously assigned, when the external electronic device does not support the resource control function, and receive a plurality of response messages to the data packet through a second time resource obtained by changing at least a portion of the first time resource, when the external electronic device supports the resource control function.

In accordance with another aspect of the disclosure, an electronic device is provided. The electronic device includes wireless communication circuitry to support a Bluetooth network, at least one processor, and a memory operatively connected with the at least one processor. The memory may store instructions that, when executed, cause the at least one processor to, through the wireless communication circuitry, create a first link with a first external electronic device based on the Bluetooth network, transmit, to the first external electronic device, resource control information for changing a resource used to transmit the data packet, create a second link with a second external electronic device based on the Bluetooth network, transmit information associated with the first link to the second external electronic device, receive a data packet including content from the first external electronic device, and transmit a response message to the data packet to the first external electronic device through a second time resource obtained by changing at least a portion of a first time resource, which is previously assigned, based on the resource control information.

In accordance with another aspect of the disclosure, an electronic device is provided. The electronic device includes wireless communication circuitry to support a Bluetooth network, at least one processor, and a memory operatively connected with the at least one processor. The memory may store instructions that, when executed, cause the at least one processor to create a first link with a first external electronic device based on the Bluetooth network, receive, from the first external electronic device, information associated with a second link formed between the first external electronic device and a second external electronic device, receive a data packet including content by monitoring the second link, based on at least a portion of the information associated with the second link, and transmit a response message responding to the data packet to the second external electronic device, based on the at least a portion of the information associated with the second link.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
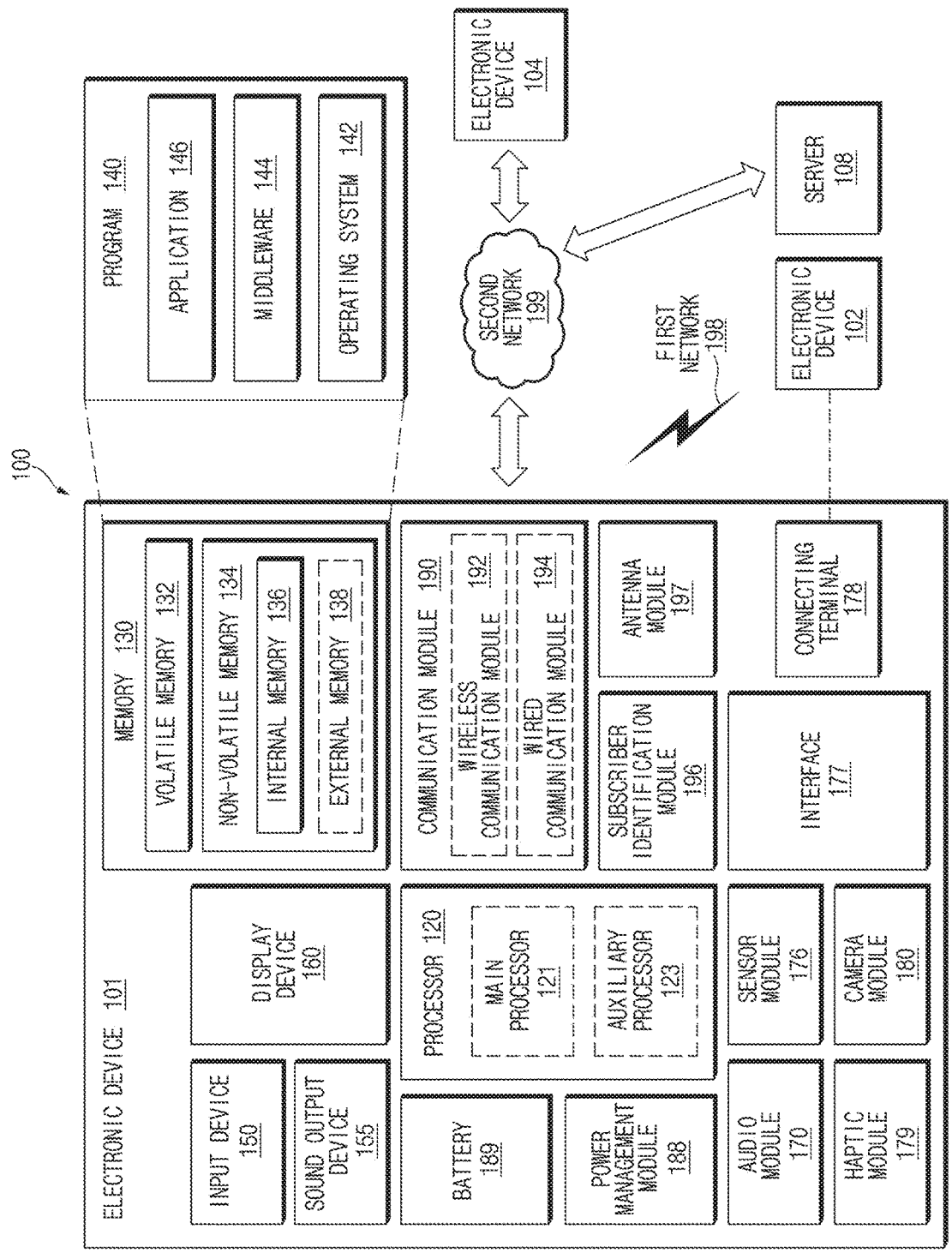
FIG. 1 is a block diagram illustrating an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
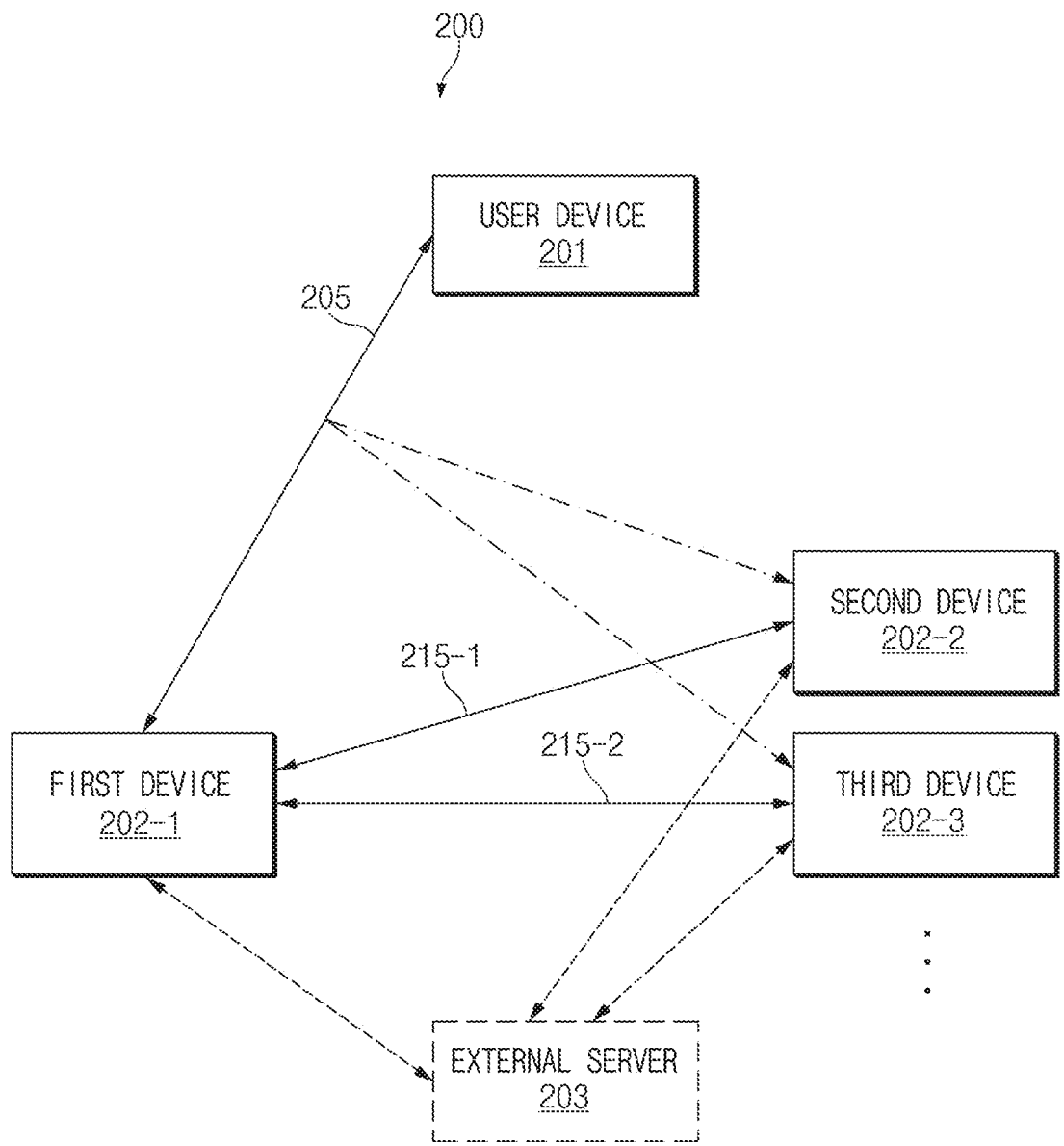
FIG. 2 is a view illustrating a topology in a Bluetooth network environment, according to an embodiment of the disclosure.

FIG. 2 is a view illustrating a topology of a Bluetooth network environment, according to an embodiment of the disclosure.

Referring to FIG. 2, a user device 201 and devices 202-1, 202-2, and 202-3 included in the topology 200 may include at least some components identical to or similar to components of the electronic device 101 illustrated in FIG. 1 or at least some functions identical to or similar to functions of the electronic device 101. For example, the user device 201 and the devices 202-1, 202-2, and 202-3 may perform short-range wireless communication over a Bluetooth network defined by the Bluetooth SIG. The Bluetooth network may include a Bluetooth legacy network and a Bluetooth low energy (BLE) network. The user device 201 and the devices 202-1, 202-2, and 202-3 perform wireless communication over one or both of a Bluetooth legacy network and a BLE network.

The user device 201 may include, for example, a user terminal such as a smartphone, a tablet, a desktop computer, or a laptop computer, and the devices 202-1, 202-2, and 202-3 may include accessory devices, such as an earphone, a headset, a speaker, a mouse, a keyboard, or a display device. The devices 202-1, 202-2, and 202-3 may previously recognize a counterpart device (e.g., the first device 202-1, the second device 202-2, or the third device 202-3) or previously store the information (e.g., address information) on the counterpart device. For example, when the first device 202-1 and the second device 202-2 are accessory devices (e.g., earphones) in a pair (set), the first device 202-1 and the second device 202-2 may previously recognize each other or previously store address information of each other.

The user device 201 may function as a master device, and the devices 202-1, 202-2, and 202-3 may function as slave devices. The number of devices functioning as the slave devices is not limited to the devices illustrated in FIG. 2. The master device or the slave device may be determined in the procedure of creating a link (e.g., reference numerals 205, 215-1, or 215-2) between devices. According to another embodiment of the disclosure, one of the first device 202-1 and the second device 202-2 (e.g., the first device 202-1) serves as a master device, and a remaining one of the first device 202-1 and the second device 202-2 serves as a slave device.

The master device may control a physical channel. For example, although the master device may transmit a data packet, the slave device may transmit a data packet to the master device only after receiving the data packet. In another example, the channel resource (e.g., a frequency hopping channel) for transmission of the data packet may be generated based on the clock of the master device. In a Bluetooth legacy network, a time resource (e.g., a time slot) may be determined based on the clock of the master device. The time slot may be, for example, 625 μs (microsecond). In the BLE network, the master device and the slave device may transmit a data packet at every specified interval, and make a response after a specified time (e.g., the inter frame space (T IFS), about 150 us) if the data packet is received.

The user device 201 may transmit a data packet including content, such as text, voice, an image, or a video, to the devices 202-1, 202-2, and 202-3. Even at least one of the device 202-1, 202-2, or 202-3 may transmit a data packet, as well as the user device 201, depending on the type of content included in the data packet. For example, when music is reproduced in the user device 201, a data packet may be transmitted only by the user device 201. When the user device 201 makes a call, even at least one of device 202-1, 202-2, or 202-3 as well as the user device 201 may transmit a data packet including content (e.g., voice data) to the user device 201. When only the user device 201 transmits the data packet, the user device 201 may be referred to as a source device, and the devices 202-1, 202-2, and 202-3 may be referred to as sink devices.

When the user device 201 creates (or establishes) a plurality of links with the devices 202-1, 202-2, and 202-3 to transmit a data packet, the resource consumption and the power consumption may be increased in the user device 201. Accordingly, the user device 201 may establish only a first link 205 with the first device 202-1 and may transmit a data packet to the first device 202-1 through the first link 205. In this case, at least one other device (e.g., reference numeral 202-2 or 202-3) may monitor the first link 205 to receive the data packet including content. In this case, the user device 201 may be referred to as a device under test (DUT), the first device 202-1 may be referred to as a primary earbud (PE) or primary equipment (PE), and at least one another device (e.g., reference numeral 202-2 or 202-3) may be referred to as a secondary earbud (or secondary equipment).

According to an embodiment of the disclosure, the first device 202-1 may establish the second link 215-1 with the second device 202-2. The first device 202-1 may transmit information associated with the first link 205 to the second device 202-2 through the second link 215-1 such that the second device 202-2 monitors the first link 205 and transmits a response message to the user device 201. The information associated with the first link 205 may include address information (e.g., the Bluetooth address of the master device of the first link 205, the Bluetooth address of the user device 201, and/or the Bluetooth address of the first device 202-1), piconet clock information (e.g., clock native (CLKN) of the master device of the first link 205), logical transport (LT) address information (e.g., information assigned by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response packet (EIR). The EIR packet may include resource control information of the first link 205 and/or information on a manufacturer. The second device 202-2 may determine a hopping channel or frequency hopping channel of the first link 205 based on the address information and the clock information, and may decrypt the encrypted data packet based on the link key information. The second device 202-2 may generate an access code or channel access code and address information (e.g., LT address information) corresponding to the first link 205 based on the information associated with the first link 205, and transmit a response message including the generated access code and address information to the user device 201. The user device 201 may determine whether to retransmit a data packet, based on the response message transmitted from the second device 202-2 even though the user device 201 does not establish a link with the second device 202-2.

In the same manner, the first device 202-1 may establish the third link 215-2 with the third device 202-3 and may transmit information associated with the first link 205 to the third device 202-3 through the third link 215-2. According to embodiments described below, the operations performed between the first device 202-1 and the second device 202-2 and the principle associated with the operations may be applied to the first device 202-1 and the third device 202-3.

According to another embodiment of the disclosure, when the first device 202-1 and the second device 202-2 support the same user account or a similar user account (e.g., a family account), the first device 202-1 and the second device 202-2 may share information associated with the first link 205 through an external device (e.g., an external server 203) internetworking with the first device 202-1 or the second device 202-2 based on the same or similar user account. In this case, the topology 200 may further include the external server 203. For example, the first device 202-1 transmits information associated with the first link 205 to the external server 203, and the external server 203 transmits information associated with the first link 205 to the second device 202-2.

According to another embodiment of the disclosure, the second device 202-2 may share the information associated with the first link 205 with the user device 201. For example, the user device 201 may transmit information associated with the first link 205 to the second device 202-2 through a separate link (not illustrated), and may release the separate link when the transmission of the information associated with the first link 205 is completed.

The first device 202-1 and the second device 202-2 may transmit a response message to the user device 201 to notify that the data packet is normally received. The response message may include a positive acknowledgment (ACK) message indicating that the data packet is normally received and a negative acknowledgment (NACK) message indicating that the data packet is not normally received. The response message may include, for example, 1-bit information. When the ACK message is received after the transmission of the data packet is completed, the user device 201 may transmit a next data packet. When the NACK message is received or no response message is received within a specified time, the user device 201 may transmit the same data packet.

Although the second device 202-2 may transmit a response message to the first device 202-1 through the second link 215-1, the first device 202-1 may use a portion of the assigned resources to receive the data packet from the user device 201. Accordingly, resources may be wasted. When a portion of the resources of the first device 202-1 is used, the user device 201 may not receive the response message or the reception of the response message may be delayed. Accordingly, the performance in the transmission of the data packet may be degraded or the power consumption may be increased. In addition, as the number of devices (e.g., 202-2 and 202-3) having no link with the user device 201 is increased, the time taken for the first device 202-1 to confirm the reception of the data packet from other devices (e.g., 202-2 and 202-3) may be increased.

The first device 202-1 and the user device 201 may change a portion of resources, which are previously assigned, such that the second device 202-2 transmits a response message to the user device 201 without passing through the first device 202-1. For example, in a Bluetooth legacy network, a half of the time slot (e.g., 0.625 ms) previously assigned to the first device 202-1 may be assigned to the second device 202-2. In another example, in the BLE network, at least some of pre-assigned parameters may be changed to transmit a data packet. For example, the parameter may include a parameter (e.g., TintV) indicating the interval of transmission of the data packet, a parameter (e.g., Npeers) indicating the number of devices receiving the data packet, a parameter (e.g., Tpeers) indicating time assigned to devices receiving the data packet, a parameter (e.g., Tstartinstance) indicating the start instance of the transmission of the data packet, a parameter (e.g., NpeersIndex) indicating the order assigned to the devices receiving the data packet, and a parameter (e.g., TrdaTimeout) indicating a time out for transmission of the next data packet. The above-described method may prevent performance degradation and power consumption of data packet transmission, and may cause the power of the first device 202-1 and the second device 202-2 to be consumed substantially uniformly.

Figure 3:
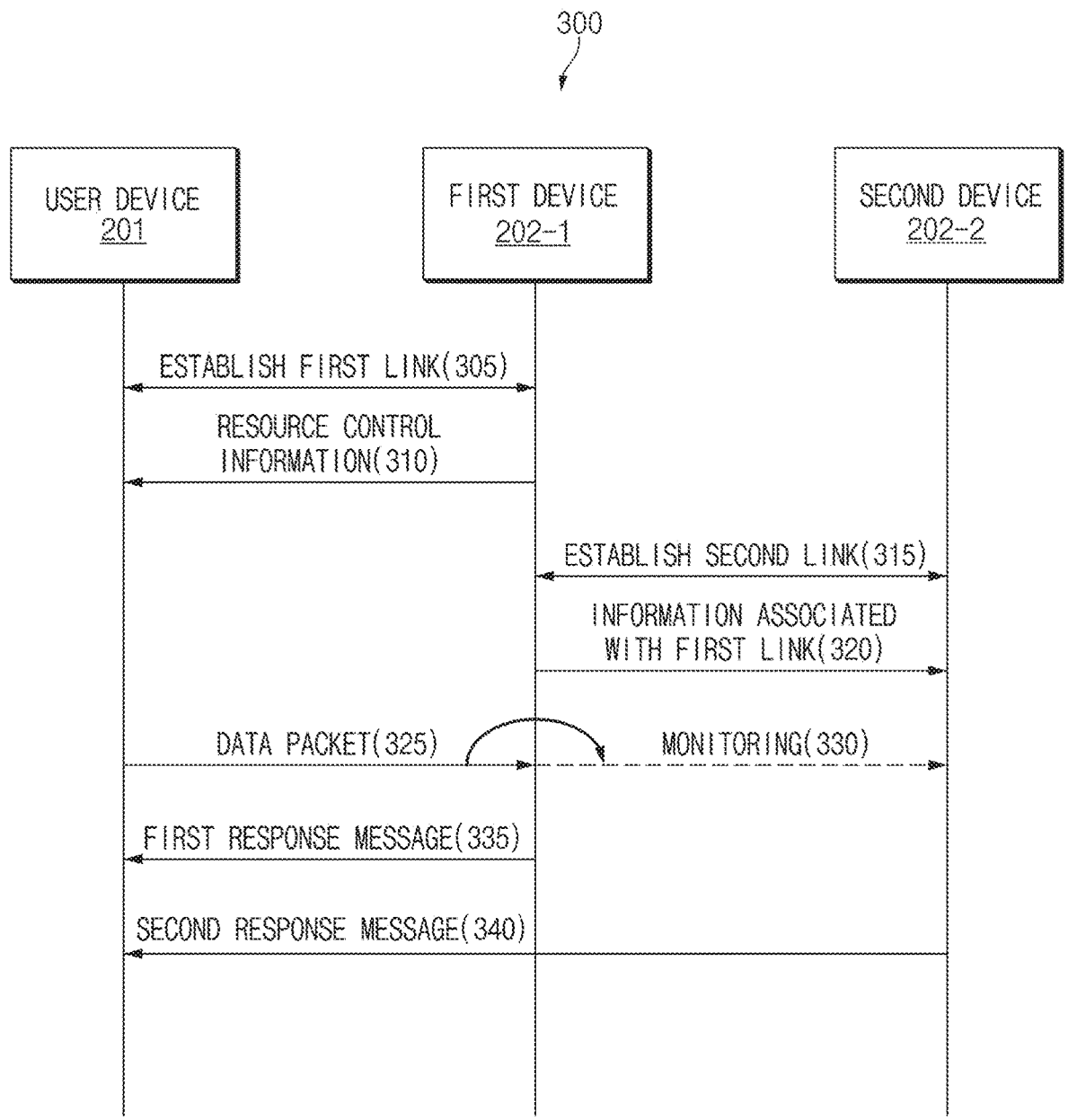
FIG. 3 is a signal flowchart to transmit a response message, according to an embodiment of the disclosure.

FIG. 3 is a signal flowchart to transmit a response message, according to an embodiment of the disclosure.

Referring to FIG. 3, in operation 305, the user device 201 may establish a first link (e.g., the first link 205 of FIG. 2) with the first device 202-1.

The user device 201 and the first device 202-1 may establish the first link 205 according to a procedure based on a Bluetooth standard. For example, the user device 201 and the first device 202-1 may perform procedures such as a baseband page procedure to recognize a counterpart device, a link manager protocol (LMP) version, a clock offset, an LMP procedure to identify a supported function (e.g., supported features), a host connection/response (request/response) procedure to confirm connectivity, an authentication procedure to verify whether the counterpart device is a trusted device, an encryption procedure, and a setup complete procedure to notify the completion of the connection (e.g., the first link 205) to the host.

In operation 310, the first device 202-1 may transmit, to the user device 201, resource control information for changing at least a portion of a pre-assigned resource for transmission of a data packet. For example, in a Bluetooth legacy network, the resource control information may indicate that the first device 202-1 supports a resource control function or may indicate that the second device 202-2 is added. In another example, in the BLE network, the resource control information may include at least one parameter to transmit a data packet. The first device 202-1 may transmit resource control information before establishing the first link (e.g., the first link 205 of FIG. 2) or during establishing the first link 205.

In operation 315, the first device 202-1 may establish a second link (e.g., the second link 215-1 of FIG. 2) with the second device 202-2. According to one embodiment, the first device 202-1 may establish the second link 215-1 with the second device 202-2 before establishing the first link 205 to the user device 201.

The first device 202-1 and the second device 202-2 may establish the second link 215-1 according to a procedure based on the Bluetooth standard used to establish the first link 205. For example, the first device 202-1 and the second device 202-2 may perform a baseband page procedure, an LMP procedure, a host connection/response procedure, an authentication procedure, an encryption procedure, and a setup completion procedure In operation 320, the first device 202-1 may transmit information associated with the first link 205 to the second device 202-2. The information associated with the first link 205 may include, for example, at least one of address information, clock information, channel information, SDP result information, information on a supported function, link key information, or an EIR packet. In another example, the information associated with the first link 205 may further include a parameter including the resource control information. The first device 202-1 may transmit information associated with the first link 205 to the second device 202-2 before establishing the second link 215-1 or during establishing the second link 215-1.

The first device 202-1 and the second device 202-2 may negotiate resource information for transmitting a response message. For example, in a Bluetooth legacy network, the first device 202-1 and the second device 202-2 may determine a device to transmit a response message in a first half slot (e.g., a second interval 1212 of FIG. 12A) of a pre-assigned time slot and a device to transmit a response message in a second half slot (e.g., a third interval 1213 of FIG. 12A). In another example, in a BLE network, the first device 202-1 and the second device 202-2 may negotiate at least one of the parameters (e.g., TintV, Npeers, Tpeers, Tstartinstance, NpeersIndex, or TrdaTimeout).

The first device 202-1 and the second device 202-2 may negotiate resource information based on a device functioning as a master device or a device (e.g., the first device 202-1) transmitting information associated with the first link 205. For example, when the first device 202-1 functions as a master device, the first device 202-1 and the second device 202-2 may determine the first device 202-1 as using the first half slot. In another example, when the second device 202-2 receives information associated with the first link 205, the first device 202-1 and the second device 202-2 may determine the second device 202-2 as using the second half slot.

The first device 202-1 and the second device 202-2 may negotiate resource information for transmitting a response message based on resource control information included in the information associated with the first link 205.

The first device 202-1 and the second device 202-2 may negotiate resource information for transmitting a response message separately from the resource control information. For example, the first device 202-1 and the second device 202-2 may negotiate resource information for transmitting a response message during or after performing operation 315. In this case, the device which transmits the response message in the first half slot may be determined as a device (e.g., the first device 202-1) which functions as a master device or as a device (e.g., the second device 202-2) which functions as a slave device (e.g., a second device 202-2). In another example, the first device 202-1 and the second device 202-2 may negotiate the resource information based on a subject to transmit information associated with the first link 205. In this case, the device which transmits the response message in the first half slot may be determined as a device which transmits information associated with the first link 205 (e.g., the first device 202-1) or as a device (e.g., the second device 202-2) which receives the information associated with the first link 205.

In operation 325, the user device 201 may transmit a data packet including content to the first device 202-1 through the first link 205.

In operation 330, the second device 202-2 may monitor the first link 205 based on at least a portion (e.g., address information or clock information) of the information associated with the first link 205. The second device 202-2 may receive the same data packet as the data packet received by the first device 202-1 through monitoring. Operation 330 may be referred to as shadowing or snooping.

In operation 335, the first device 202-1 may transmit the response message to the received data packet to the user device 201 through the first link 205. The response message may include, for example, an acknowledgement (ACK) message or a negative-acknowledgement (NACK) message. The first device 202-1 may transmit the response message of the first device 202-1 based on a resource (hereinafter referred to as a second resource) obtained by changing at least a portion of a previously assigned resource (hereinafter referred to as a first resource) to avoid the collision with the response message transmitted by the second device 202-2. The second resource may be changed based on resource control information transmitted from the first device 202-1 to the user device 201.

In operation 340, the second device 202-2 may transmit a response message to the data packet received in operation 330 to the user device 201, based on the information associated with the first link 205 received in operation 320. For example, the second device 202-2 may transmit a response message including an access code corresponding to the first link 205 through a resource indicated based on resource control information (or resource information negotiated between the second device 202-2 and the first device 202-1).

Figure 4:
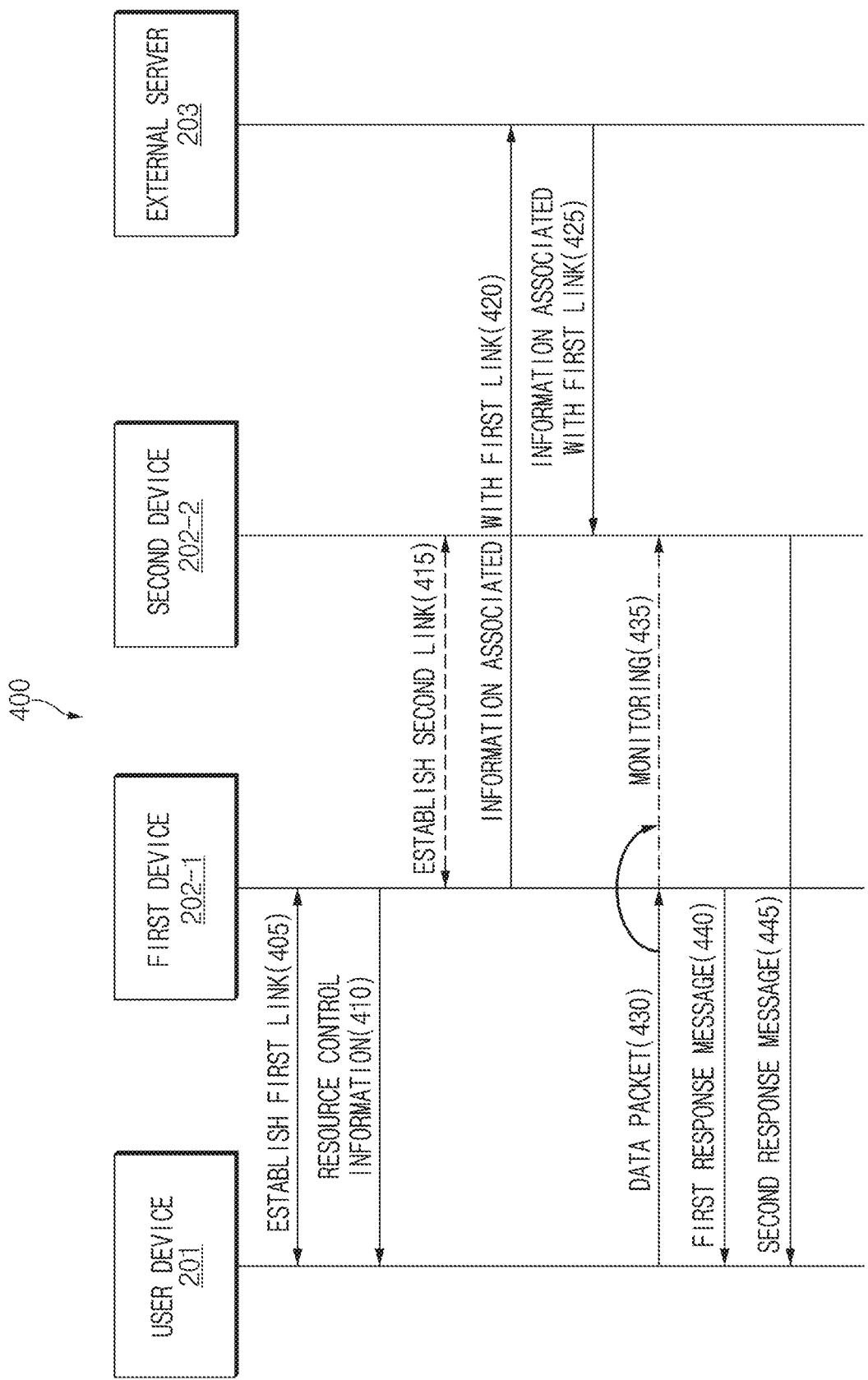
FIG. 4 is another signal flowchart to transmit a response message, according to an embodiment of the disclosure.

FIG. 4 is another signal flowchart to transmit a response message, according to an embodiment of the disclosure.

Referring to FIG. 4, the external server 203 may include an external device internetworking with the first device 202-1 or the second device 202-2 based on a user account the same as or similar to a user account of the first device 202-1 or the second device 202-2.

Referring to FIG. 4, in operation 405, the user device 201 may establish a first link (e.g., the first link 205 of FIG. 2) with the first device 202-1.

In operation 410, the first device 202-1 may transmit resource control information for changing at least a portion of a resource which is previously assigned to transmit a data packet to the user device 201. The first device 202-1 may transmit resource control information before establishing the first link 205 or during establishing the first link 205.

In operation 415, the first device 202-1 may establish a second link (e.g., the second link 215-1 of FIG. 2) with the second device 202-2. The first device 202-1 may establish the second link 215-1 with the second device 202-2 before establishing the first link 205 with the user device 201. The first device 202-1 and the second device 202-2 may optionally skip operation 415.

In operation 420, the first device 202-1 may transmit information associated with the first link 205 to the external server 203. The first device 202-1 may transmit information associated with the first link 205 to the external server 203 before establishing the second link 215-1 or during establishing the second link 215-1. The information associated with the first link 205 may include, for example, at least one of address information, clock information, channel information, SDP result information, information on supported functions, link key information, or an EIR packet. In another example, the information associated with the first link 205 may further include a parameter including the resource control information.

In operation 425, the external server 203 may transmit information associated with the first link 205 to the second device 202-2.

The first device 202-1 and the second device 202-2 may negotiate resource information for transmitting a response message.

The first device 202-1 and the second device 202-2 may negotiate resource information for transmitting a response message based on resource control information included in the information associated with the first link 205.

The first device 202-1 and the second device 202-2 may negotiate resource information for transmitting a response message separately from the resource control information. For example, the first device 202-1 and the second device 202-2 may negotiate resource information for transmitting a response message during or after performing operation 415. In this case, the device which transmits the response message in the first half slot may be determined as a device (e.g., the first device 202-1) which functions as a master device or a device (e.g., the second device 202-2) which functions as a slave device (e.g., a second device 202-2). In another example, the first device 202-1 and the second device 202-2 may negotiate the resource information based on a subject to transmit information associated with the first link 205. In this case, the device which transmits the response message in the first half slot may be determined as a device which transmits information associated with the first link 205 (e.g., the first device 202-1) or as a device (e.g., the second device 202-2) which receives the information associated with the first link 205.

According to another embodiment of the disclosure, the external server 203 may determine resource information for transmitting a response message and may transmit the resource information to the first device 202-1 and the second device 202-2. For example, the external server 203 may determine a device (e.g., the first device 202-1), which functions as a master device, or a device (e.g., the second device 202-2) which functions as a slave device as transmitting a response message in the first half slot. In another example, the external server 203 may negotiate the resource information based on the subject transmitting the information associated with the first link 205. In this case, the device which transmits the response message in the first half slot may be determined as a device (e.g., first device 202-1) which transmits information associated with the first link 205 or as a device (e.g., the second device 202-2) which receives the information associated with the first link 205.

In operation 430, the user device 201 may transmit a data packet including the content to the first device 202-1 through the first link 205.

In operation 435, the second device 202-2 may receive a data packet the same as a data packet received by the first device 202-1 by performing shadowing based on at least a portion (e.g., address information or clock information) of information, which is received from the external server 203, associated with the first link 205.

In operation 440, the first device 202-1 may transmit the response message to the received data packet to the user device 201 through the first link 205. The first device 202-1 may transmit the response message of the first device 202-1 based on a second resource obtained by changing at least a portion of a previously assigned first resource to avoid the collision with the response message transmitted by the second device 202-2. The second resource may be changed based on resource control information transmitted from the first device 202-1 to the user device 201.

In operation 445, the second device 202-2 may transmit a response message to the data packet, which is received in operation 435, to the user device 201, based on information associated with the first link 205 received in operation 425. For example, the second device 202-2 may transmit a response message including an access code and address information corresponding to the first link 205 through a resource indicated by resource control information (or resource information negotiated between the second device 202-2 and the first device 202-1).

Although not illustrated in FIG. 4, in response to receiving the response message indicating the NACK, the user device 201 may directly retransmit the same data packet or the first device 202-1 may relay the data packet. In this case, the user device 201 may request the first device 202-1 to relay the data packet.

Figure 5:
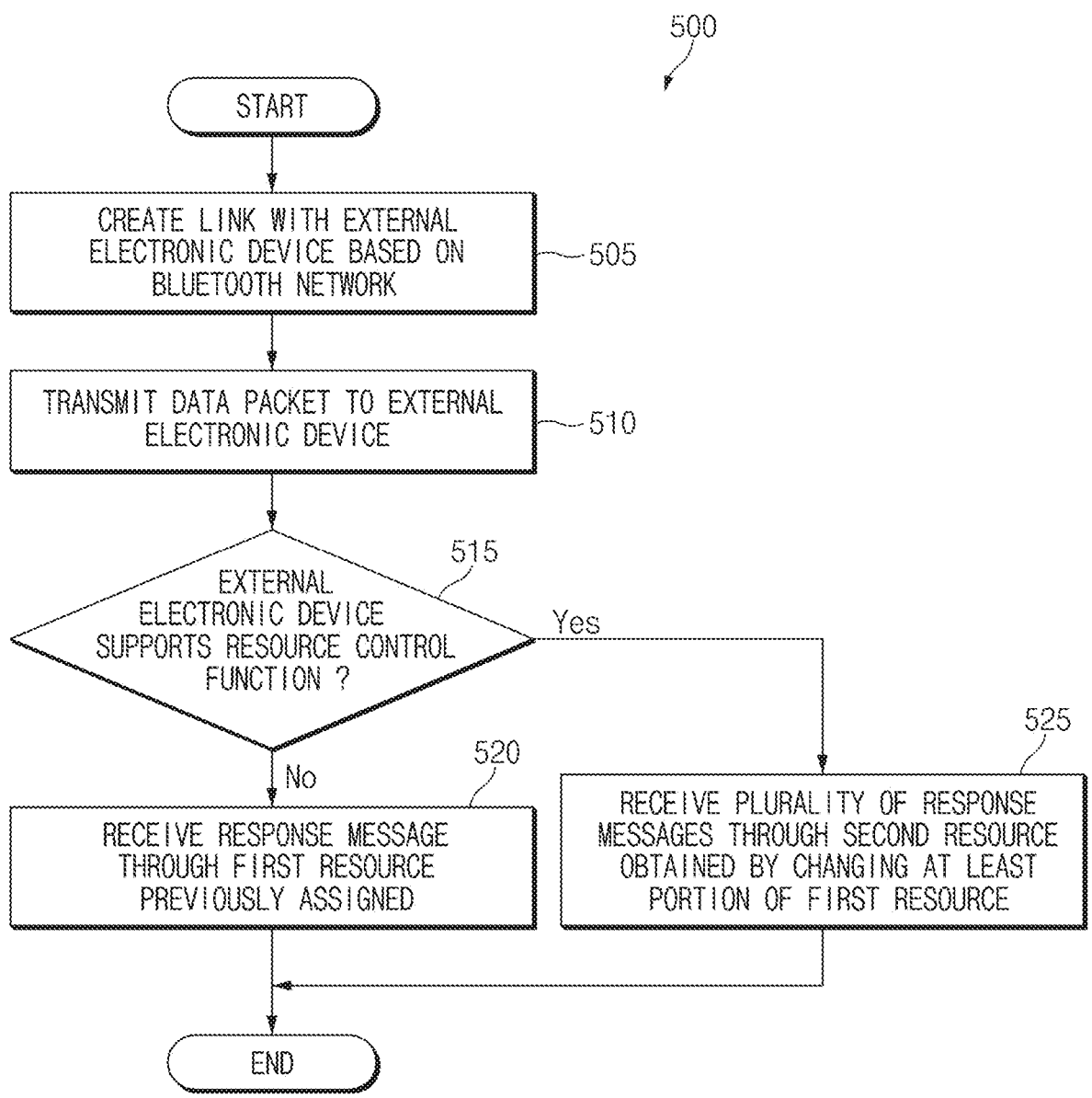
FIG. 5 is a flowchart illustrating an operation of an electronic device to receive a response message, according to an embodiment of the disclosure.

FIG. 5 is a flowchart illustrating an operation of an electronic device to receive a response message according to an embodiment of the disclosure. Embodiments illustrated in FIG. 5 may be performed by the user device 201 of FIG. 2. The user device 201 may perform operations in the flowchart through at least one component (e.g., the processor 120 or the wireless communication module 192 of FIG. 1) through at least one component included in the user device 201.

Referring to FIG. 5, in operation 505, an electronic device may create a link (e.g., the first link 205 of FIG. 2) with an external electronic device (e.g., the first device 202-1 of FIG. 2) based on a Bluetooth network through a processor and a wireless communication circuitry.

In operation 510, the electronic device may transmit a data packet including content to the external electronic device through the processor and the wireless communication circuitry. The electronic device may transmit the data packet based on a first resource (e.g., at least one of a time resource or a channel resource) defined in a procedure of establishing the link.

In operation 515, the electronic device may identify whether the external electronic device supports a resource control function, through the processor. The electronic device may identify whether the external electronic device supports the resource control function, based on the resource control information. The resource control information may be received from the external electronic device, before, during, or after creating the link. Hereinafter, various embodiments of identifying whether the external electronic device supports the resource control function will be described with reference to FIGS. 8 to 11.

The electronic device may perform operation 515 before transmitting a data packet (operation 505 or operation 510). For example, the electronic device may perform operation 515 before starting to transmit the data packet including the content. In another example, the electronic device may perform operation 515 after transmitting a data packet including some content (e.g., a video) and before transmitting a data packet including another content (e.g., an audio). In another example, when the electronic device and the external electronic device have a history of a link established or internetwork with each other through the same user account or a similar user account (e.g., a family account), the electronic device may identify that the external electronic device performs the resource control function, without performing operation 515. In this case, the electronic device may perform operation 525 after operation 510.

When the external electronic device does not support the resource control function, the electronic device may receive a response message from the external electronic device through a first resource, which is previously assigned, through the processor and the wireless communication circuitry in operation 520. In this case, even if a plurality of response messages are transmitted from the plurality of external electronic devices (e.g., the first device 202-1 and the second device 202-2 of FIG. 2), the electronic device may receive only the response message transmitted through the first resource which is previously assigned.

When the external electronic device supports the resource control function, in operation 525, the electronic device may receive a plurality of response messages through a second resource obtained by changing at least a portion of the first resource, through the processor and the wireless communication circuitry. The plurality of response messages may be received from another external electronic device (e.g., the second device 202-2 or the third device 202-3) supporting a Bluetooth network in addition to the external electronic device creating the link with the electronic device.

When the link with the external electronic device is created based on the Bluetooth legacy network, the electronic device may reassign the first resource by dividing the first resource (e.g., a time slot), which is previously assigned, by the number of different external electronic devices. For example, when one different external electronic device is provided, the electronic device may receive a response message from the external electronic device through a half (e.g., 0.3125 ms) of the previously assigned time slot (e.g., 0.6625 ms) and may receive a response message from a different external electronic device in a remaining half time slot.

When the link with the external electronic device is created based on a BLE network, the electronic device may change at least a portion of a first resource (e.g., TintV, Npeers, Tpeers, Tstartinstance, Npeersindex, or TradTimeout) which is included in the resource control information and is previously assigned to transmit the data packet.

Figure 6:
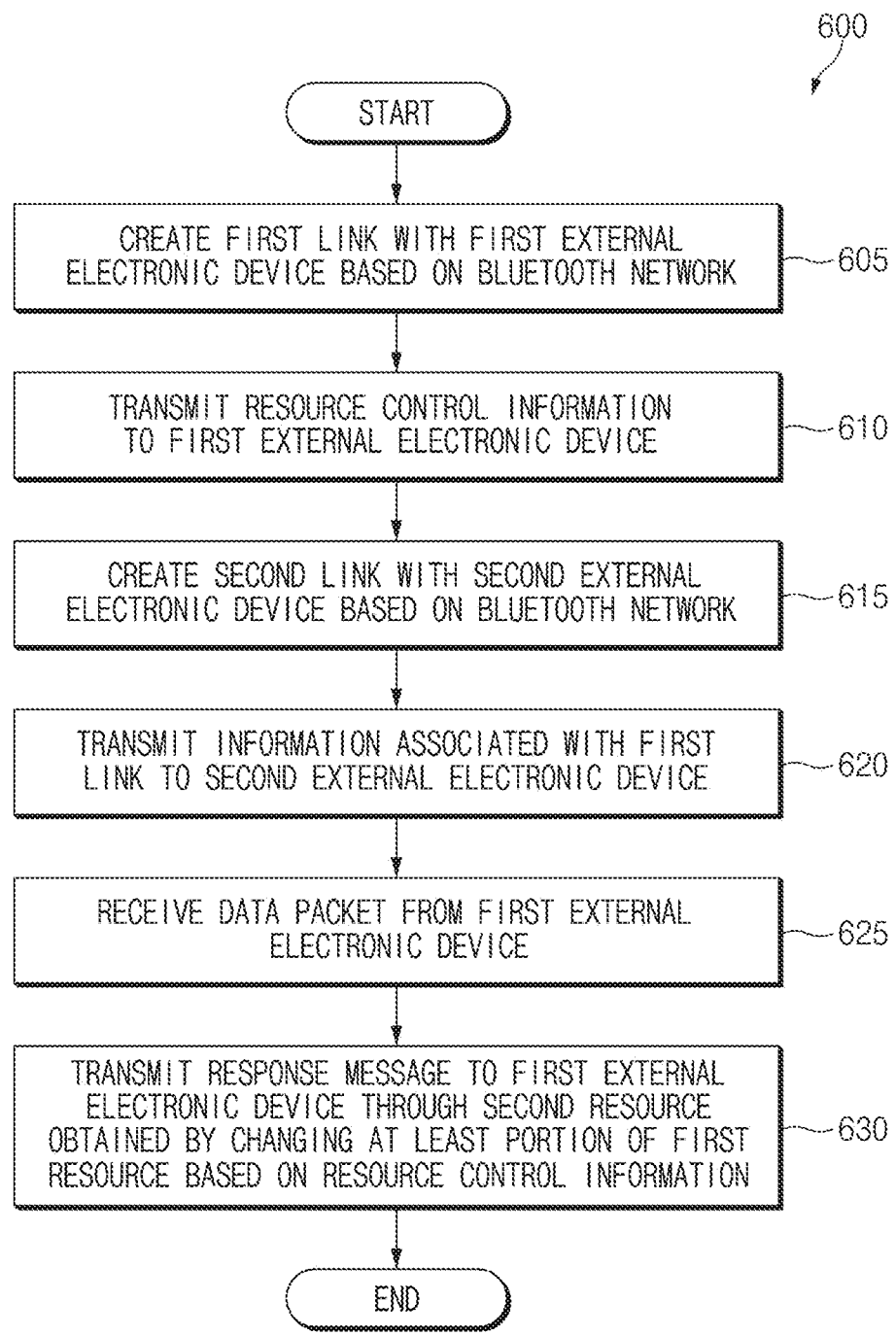
FIG. 6 is a flowchart illustrating an operation of an electronic device to transmit a response message, according to an embodiment of the disclosure.

FIG. 6 is a flowchart illustrating an operation of an electronic device to transmit a response message, according to an embodiment of the disclosure. The embodiments illustrated in FIG. 6 may be performed by a device (e.g., the first device 202-1) to create a link with the user device 201 of FIG. 2. The first device 202-1 may perform operations according to the flowchart 600 through at least one component (e.g., the processor 120 and the wireless communication module 192 of FIG. 1) included in the first device 202-1.

Referring to FIG. 6, in operation 605, an electronic device may create a link (e.g., the first link 205 of FIG. 2) with a first external electronic device (e.g., the user device 201 of FIG. 2) based on a Bluetooth network through a processor and a wireless communication circuitry.

In operation 610, the electronic device may transmit resource control information to the first external electronic device through the processor and the wireless communication circuitry. The electronic device may transmit resource control information to the first external electronic device before creating the first link or while creating the first link.

The resource control information may indicate whether the electronic device may support a resource control function or whether another second external electronic device is added. According to another embodiment, the resource control information may indicate at least one parameter for transmitting a data packet.

Whenever another second external electronic device is added, the electronic device may transmit resource control information to the first external electronic device. The electronic device may transmit, to the first external electronic device, the resource control information in each specified period. The resource control information to the first external electronic device after a data packet is received or may transmit the resource control information to the first external electronic device after some data packets are received or before another data packet is received.

In operation 615, the electronic device may create a second link (e.g., the second link 215-1 of FIG. 2) with a second external electronic device (e.g., the second device 202-2 of FIG. 1) based on a Bluetooth network through the processor and the wireless communication circuitry. The electronic device may create the second link with the second external electronic device while maintaining the first link. The electronic device may create the first link with the first external electronic device after creating the second link with the second external electronic device.

In operation 620, the electronic device may transmit information associated with the first link to the second external electronic device through the processor and the wireless communication circuitry. The information associated with the first link may include, for example, at least one of address information, clock information, channel information, SDP result information, information on supported functions, link key information, or an EIR packet. In another example, the information associated with the first link may further include a parameter including the resource control information.

The electronic device may transmit information associated with the first link to the second external electronic device before creating the second link or while creating the second link. The electronic device may transmit updated information to the second external electronic device whenever the resource control information of the information associated with the first link is updated. The electronic device may transmit the information associated with the first link to the second external electronic device through an external server (e.g., the external server 203 of FIG. 4).

In operation 625, the electronic device may receive a data packet from the first external electronic device through the processor and the wireless communication circuitry. For example, the electronic device may receive the data packet through the first link.

In operation 630, the electronic device may transmit a response message to the first external electronic device through a second resource obtained by changing at least a portion of a first resource, which is previously assigned, based on the resource control information. The electronic device may transmit the response message through the processor and the wireless communication circuitry. The electronic device may generate an access code and address information (e.g., LT address information) corresponding to the first link and may transmit a response message including the generated access code and the generated address information.

Figure 7:
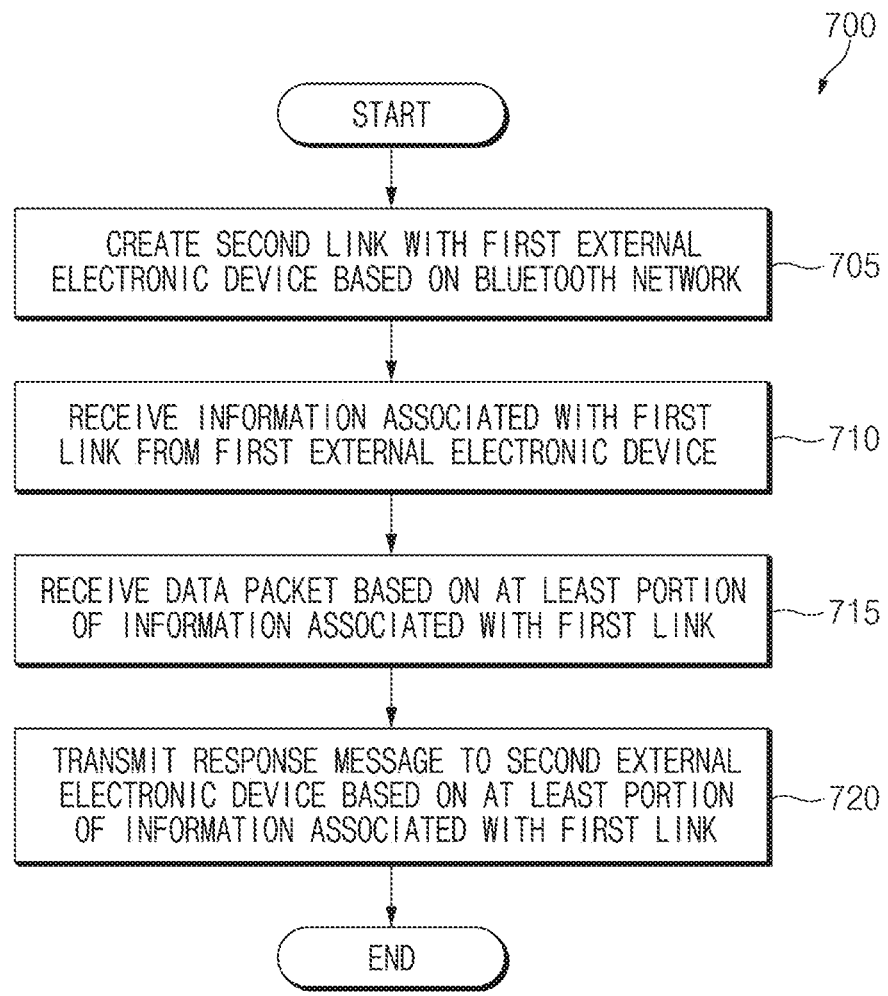
FIG. 7 illustrates another flowchart of the operation of the electronic device to transmit the response message, according to an embodiment of the disclosure.

FIG. 7 is another flowchart illustrating an operation of an electronic device to transmit a response message according to an embodiment of the disclosure. The embodiments illustrated in FIG. 7 may be performed by a device (e.g., the second device 202-2) that does not create a link with the user device 201 of FIG. 2. The second device 202-2 may perform operations according to the flowchart 700 through at least one component (e.g., the processor 120 and the wireless communication module 192 of FIG. 1) included in the second device 202-2.

Referring to FIG. 7, in operation 705, the electronic device may create a second link (e.g., the second link 215-1 of FIG. 2) with the first external electronic device (e.g., the first device 202-1 of FIG. 2) based on a Bluetooth network through the processor and the wireless communication circuitry.

In operation 710, the electronic device may receive, from the first external electronic device, information associated with the first link (e.g., the first link 205 of FIG. 2) between the first external electronic device and the second external electronic device (e.g., the user device 201 of FIG. 2) through the processor and the wireless communication circuitry. The information associated with the first link may include, for example, at least one of address information, clock information, channel information, SDP result information, information on supported functions, link key information, or an EIR packet. In another example, the information associated with the first link may further include a parameter including the resource control information.

The electronic device may receive information associated with the first link from the first external electronic device before creating the second link or while creating the second link. The electronic device may receive, from the first external electronic device, resource control information of the information associated with the first link separately from another information. The electronic device may receive information associated with the first link from an external device (e.g., the external server 203 or the third device 202-3 of FIG. 2) internetworking with the electronic device or the first external electronic device through a user account.

In operation 715, the electronic device may receive a data packet based on at least a portion of information associated with the received first link, through the processor and the wireless communication circuitry. For example, the electronic device may determine a hopping channel of a first link through address information and clock information and monitor the determined hopping channel, thereby receiving a data packet received from the second external electronic device.

In operation 720, the electronic device may transmit, to the second external electronic device, a response message to a data packet received based on at least a portion of information associated with the first link through the processor and the wireless communication circuitry. For example, the electronic device may generate an access code corresponding to the first link and may transmit a response message including the generated access code to the second external electronic device.

According to the above-described method, the electronic device may receive (e.g., shadowing) a data packet from the second external electronic device using information associated with the first link without creating the link with the second external electronic device and may transmit, to the second external electronic device, the response message to the data packet received through the changed second resource. As the electronic device does not create a link with the second external electronic device, the electronic device may reduce power consumption and delay time taken to create a link.

FIGS. 8 to 11 illustrate various embodiments of the disclosure in which the user device 201 identifies whether the first device 202-1 supports the resource control function.

Figure 8:
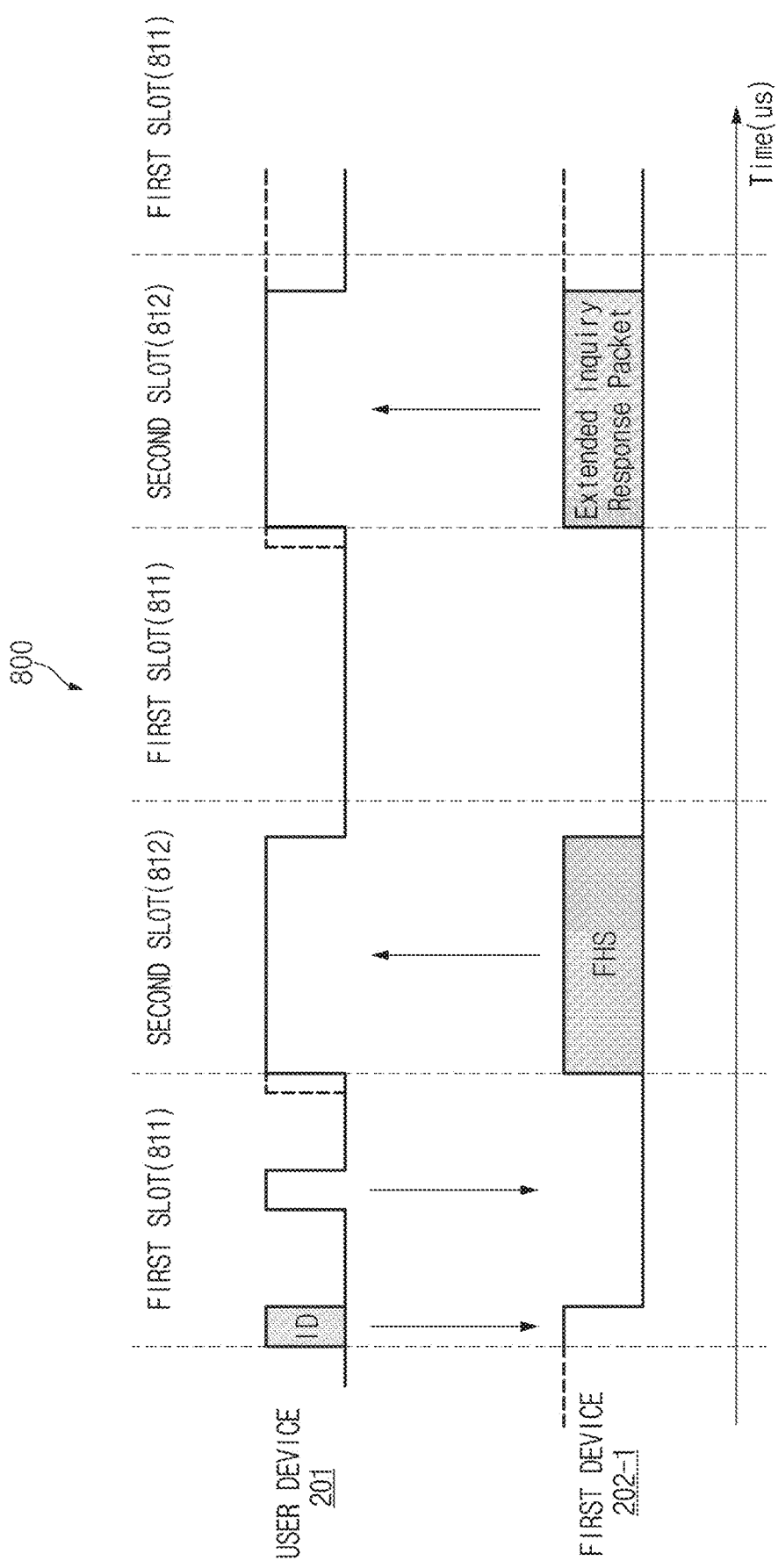
FIG. 8 illustrates an inquiry procedure, according to an embodiment of the disclosure.

FIG. 8 illustrates a graph illustrating an inquiry procedure according to an embodiment of the disclosure.

Referring to FIG. 8, the user device 201 and the first device 202-1 may perform an inquiry procedure based on a Bluetooth legacy standard (e.g., an institute of electrical and electronics engineers (IEEE) 802.xx (xx is a natural number)) to discover the counterpart device to establish the first link (e.g., the first link 205 of FIG. 2).

A horizontal axis of the graph 800 may indicate a time (unit: us). In graph 800, a first slot 811 may indicate an interval that the user device 201 transmits data, and a second slot 812 may indicate an interval that the first device 202-1 transmits data. According to an embodiment, the first slot 811 and the second slot 812 may include a specified interval (e.g., 625 us).

The user device 201 may transmit an identification (ID) packet for at least some interval of the first slot 811. The ID packet may include, for example, a device access code (DAC) or an inquiry access code (IAC) of the user device 201. According to an embodiment, the ID packet may be transmitted for a specified interval (e.g., 68 us).

The first device 202-1 may activate the wireless communication circuitry (e.g., at least a portion of the wireless communication module 192 of FIG. 1) to establish a link with the user device 201 and perform listening for the first slot 811, thereby receiving the ID packet. In response to the reception of the ID packet, the first device 202-1 may transmit a frequency hop sync (FHS) packet to the user device 201 for at least some interval of the second slot 812. The FHS packet may include control information (e.g., clock information or address information) for establishing the first link 205.

After transmitting the FHS packet, the first device 202-1 transmits an extended inquiry response (EIR) packet to the user device 201 in at least some interval of the next second slot 812. The EIR packet may include resource control information. For example, the EIR packet may indicate, in a 1 bit, whether the first device 202-1 may support a resource control function. The user device 201 may identify, through the EIR packet, that the first device 202-1 may support a resource control function.

Figure 9:
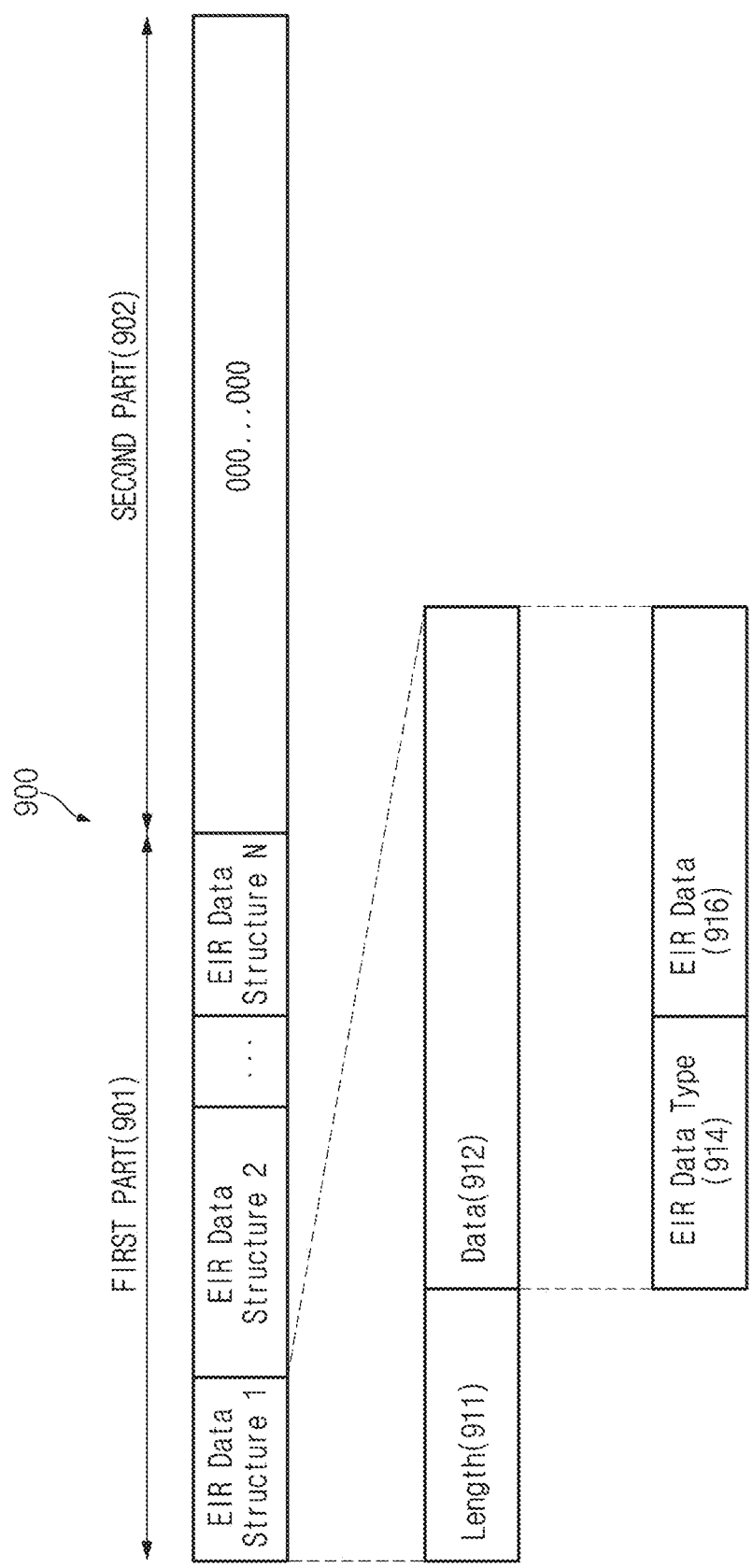
FIG. 9 illustrates a data format of an extended inquiry response (EIR) packet, according to an embodiment of the disclosure.

FIG. 9 illustrates a data format of an EIR packet according to an embodiment of the disclosure. Some of the data format of the EIR packet may be based on the Bluetooth legacy standard specification.

Referring to FIG. 9, the EIR packet 900 may include a first part 901 and a second part 902. The first part 901 may include a sequence of data structures (e.g., EIR data structure 1, EIR data structure 2, . . . and EIR data structure N; N is a natural number). The data structure may include a length field 911 indicating a length value of data and a data field 912. The data field 912 may include an EIR data type field 914 indicating a type of EIR data, and an EIR data field 916. The first device 202-1 may insert resource control information into the EIR data field 916.

Figure 10:
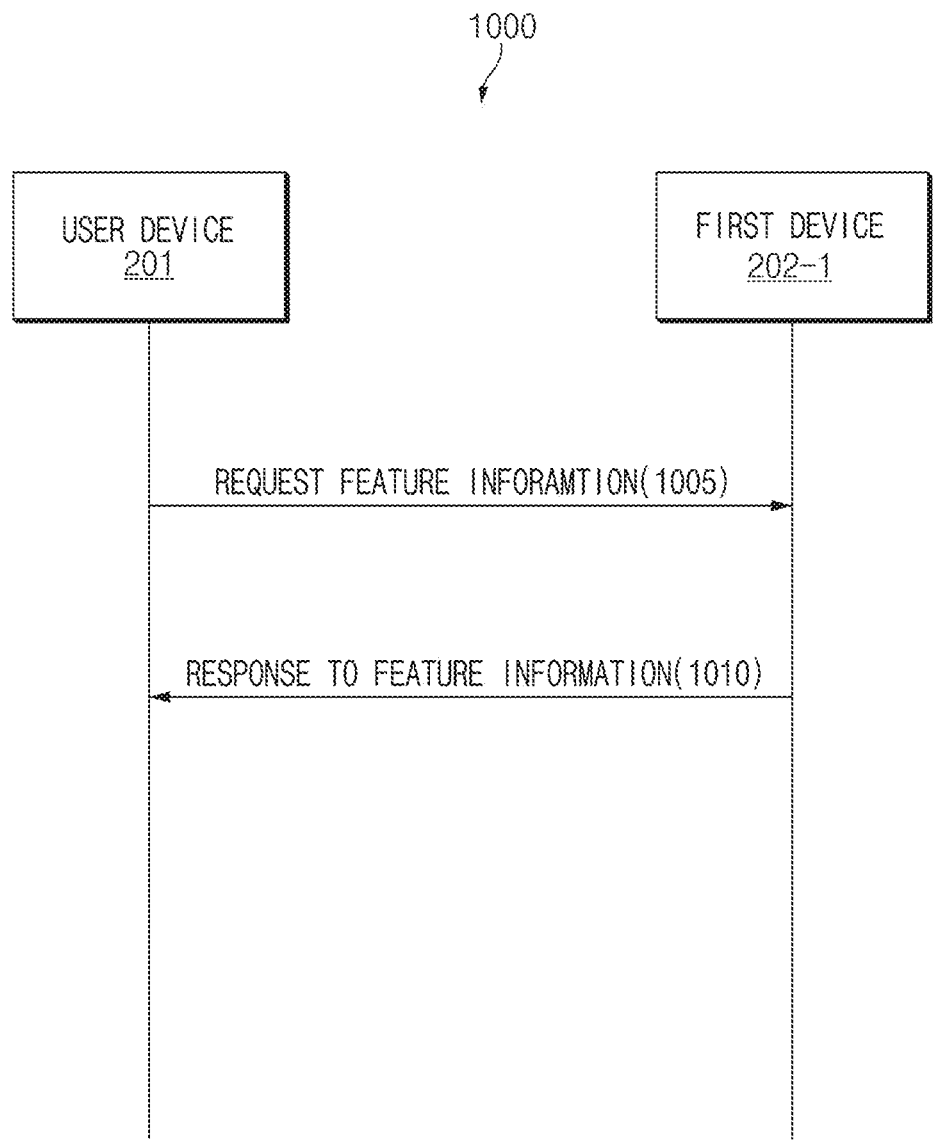
FIG. 10 illustrates a signal flowchart to share feature information, according to an embodiment of the disclosure.

FIG. 10 is a signal flowchart 1000 to share feature information, according to an embodiment of the disclosure.

Referring to FIG. 10, operations 1005 to 1010 may be performed in a procedure in which a first link (e.g., the first link 205 of FIG. 2) is established. FIG. 10 illustrates an embodiment that the user device 201 requests feature information. However, according to various embodiments, the first device 202-1 may request feature information.

In operation 1005, the user device 201 may transmit a request message for requesting feature information to the first device 202-1. The request message may include, for example, a link manager protocol (LMP)_features_req message based on a Bluetooth legacy standard or a BLE standard.

In operation 1010, the first device 202-1 may transmit a response message including feature information of the first device 202-1 in response to the request message. The response message may include, for example, an LMP_features_res message based on the Bluetooth Legacy Standard or the BLE Standard. The first device 202-1 may insert resource control information into a response message. The user device 201 may identify that the first device 202-1 supports the resource control function, through the response message.

Figure 11:
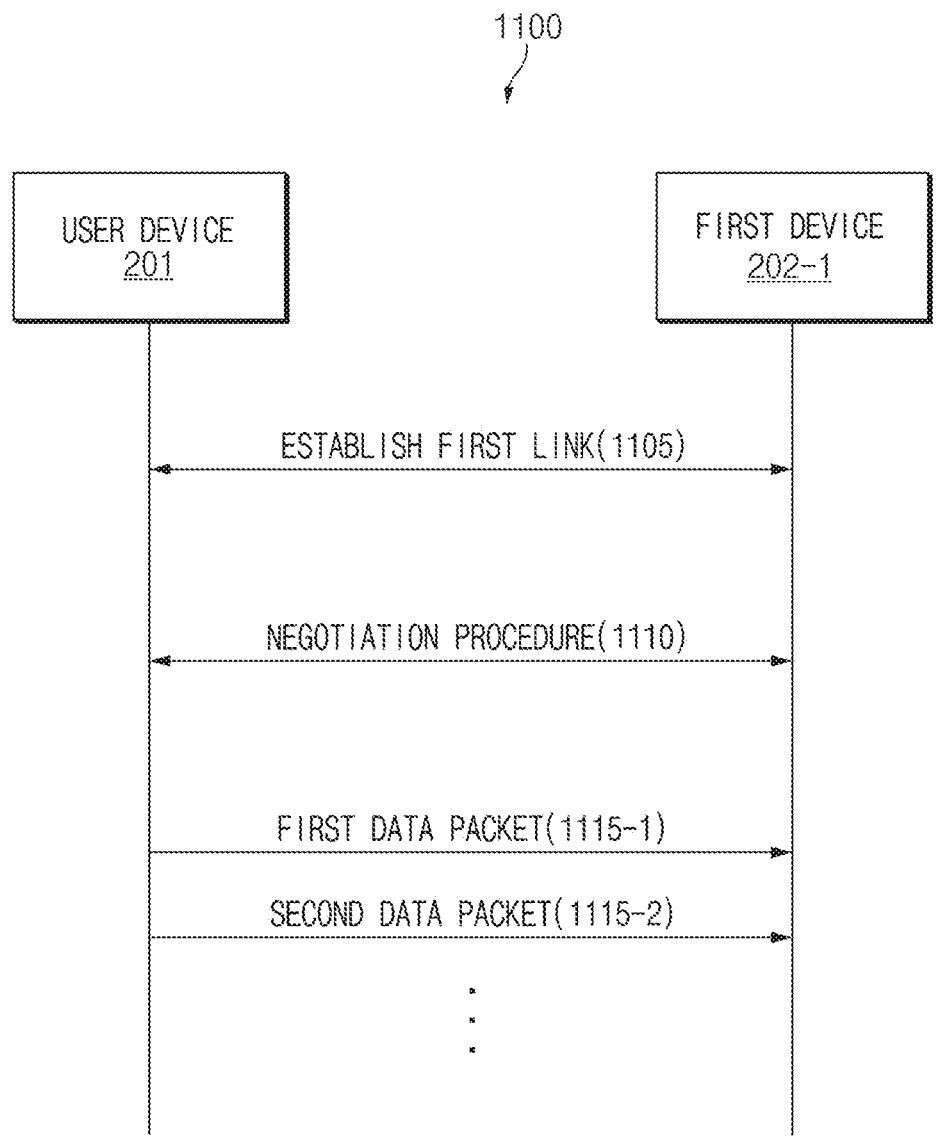
FIG. 11 illustrates a flowchart for a negotiation procedure according to an embodiment of the disclosure.

FIG. 11 illustrates a flowchart for a negotiation procedure according to an embodiment of the disclosure.

Referring to FIG. 11, the user device 201 and the first device 202-1 may perform a negotiation procedure based on the BLE standard in operation 1110 after establishing the first link (e.g., the first link 205 of FIG. 2) in operation 1105 and before transmitting data packets (e.g., operations 1115-1, 1115-2, . . . ). For example, the first device 202-1 may transmit a request for a negotiation to the user device 201 whenever creating a link (e.g., the second link 215-1 of FIG. 2) with another device (e.g., the second device 202-2).

In the negotiation procedure (operation 1110), the user device 201 and the first device 202-1 may negotiate at least one parameter for transmission of a data packet. At least one parameter may include, for example, TintV, Npeers, Tpeers, Tstartinstance, NpeersIndex, or TrdaTimeout. For example, when N (N is a natural number) devices are added in addition to the first device 202-1, the number of times, in which the user device 201 receives the response message, is increased by N, so the maximum amount of data transmitted by each device may be decreased in inverse proportional to N.

The user device 201 may identify whether the first device 202-1 may support a resource control function through a method other than the method illustrated in FIGS. 8 to 11.

For example, the user device 201 may identify whether the first device 202-1 supports a resource control function, by sharing resource control information on a logical link control and adaptation layer protocol (L2CAP) layer based on a Bluetooth standard after creating the first link 205.

In another example, the user device 201 may share resource control information through a network (e.g., cellular, WiFi, WiFi direct, IrDA, or ultra wide band (UWB)) other than a Bluetooth network.

In another example, the user device 201 may receive a user input for requesting (or requesting the addition of another device) the performance of a resource control function.

In another example, the first device 202-1 may transmit resource control information through advertising.

In another example, the user device 201 may determine that the first device 202-1 performs a resource control function when a device name of the first device 202-1 is a device name previously specified.

In another example, when the manufacturer of the user device 201 is the same as the manufacturer of the first device 202-1, the user device 201 may determine that the first device 202-1 performs a resource control function.

FIGS. 12A to 12C and 13A to 13C illustrate embodiments of controlling a resource for transmission of a data packet based on resource control information according to various embodiments of the disclosure.

Figure 12A:
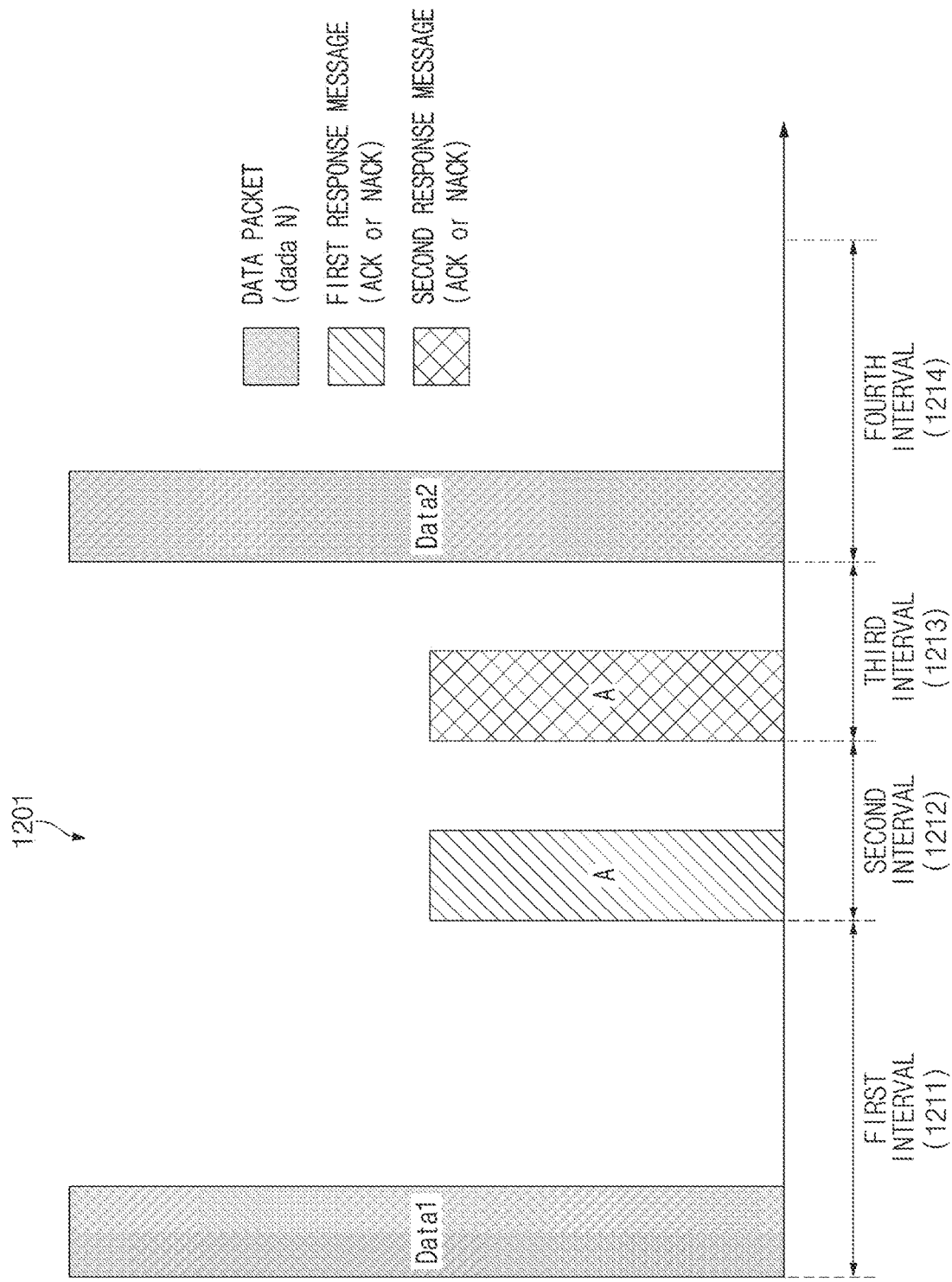
FIG. 12A illustrates an example of a time resource assigned in a Bluetooth legacy network, according to an embodiment of the disclosure.
Figure 12B:
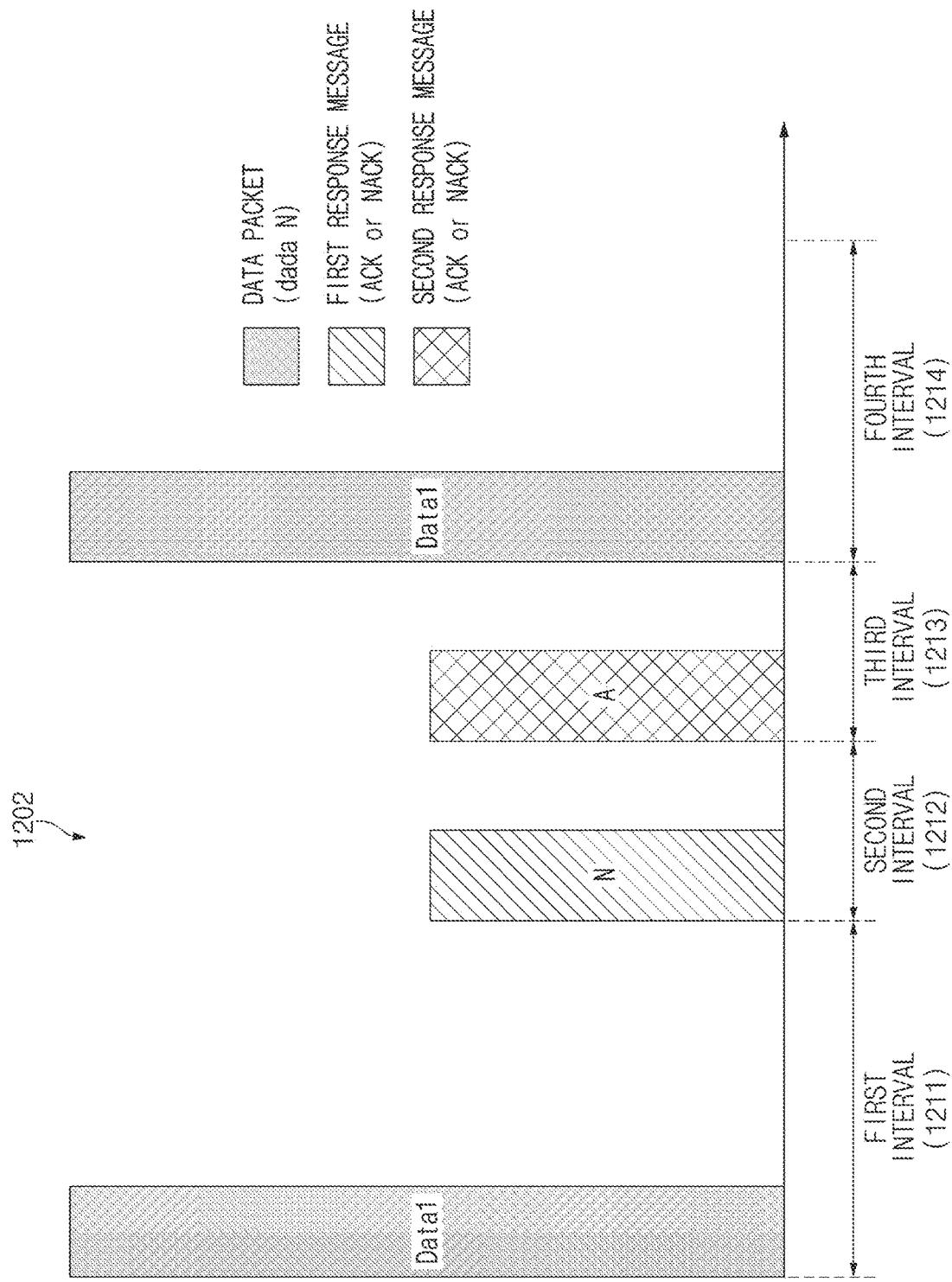
FIG. 12B illustrates another example of a time resource assigned in a Bluetooth legacy network, according to an embodiment of the disclosure.
Figure 12C:
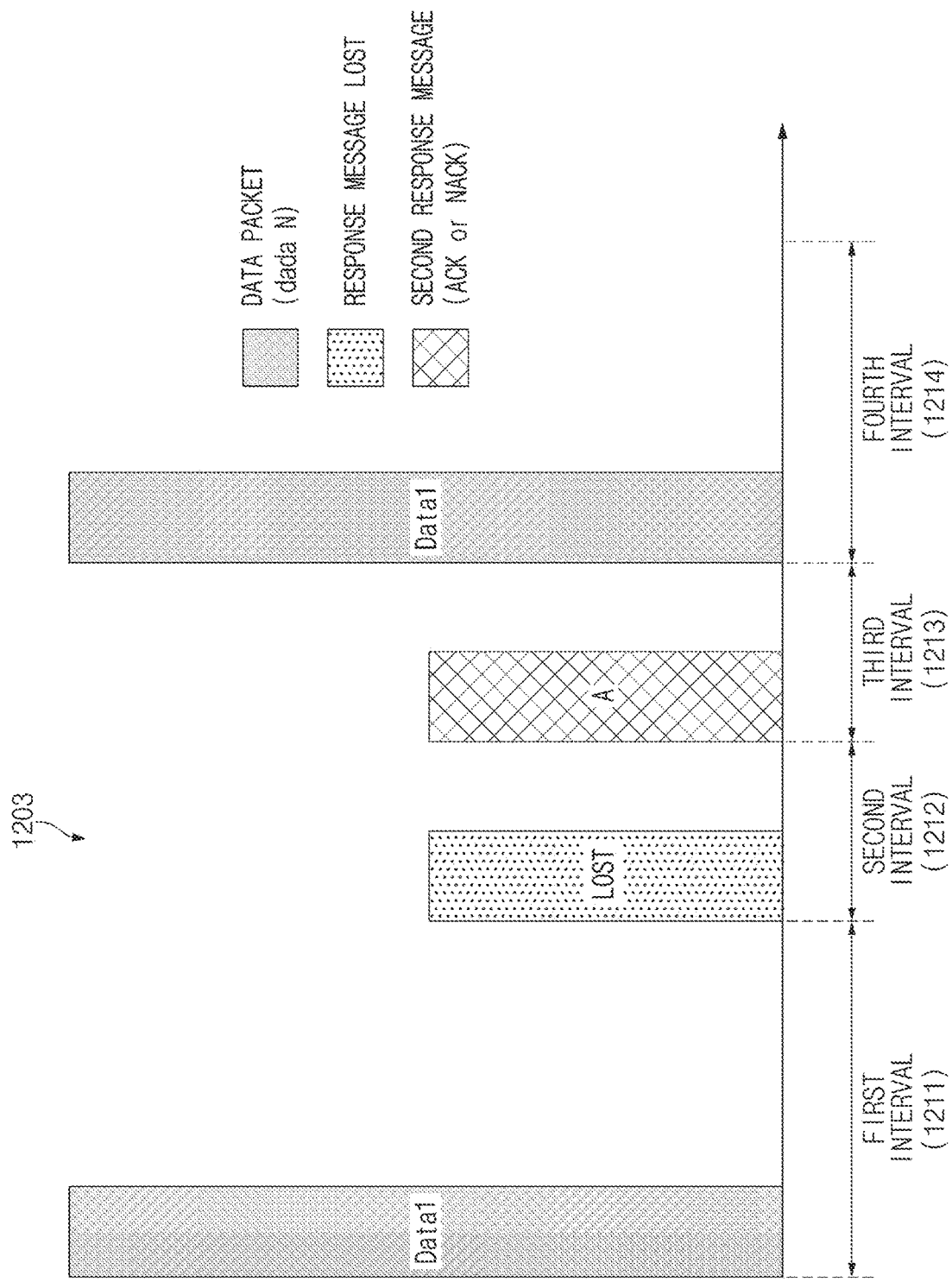
FIG. 12C illustrates another example of a time resource assigned in a Bluetooth legacy network, according to an embodiment of the disclosure.

FIGS. 12A to 12C illustrate examples of time resources associated in a Bluetooth legacy network according to various embodiments of the disclosure.

FIG. 12A illustrates an embodiment in which the user device 201 receives a response message indicating an ACK from the first device 202-1 and the second device 202-2. FIG. 12B illustrates an embodiment in which the user device 201 receives a response message indicating a NACK from the first device 202-1. FIG. 12C illustrates an embodiment in which the user device 201 does not receive a response message from the first device 202-1.

Referring to FIGS. 12A to 12C, horizontal axes of graphs 1201, 1202, and 1203 indicate time. The user device 201 may transmit a data packet (e.g., Data1) including content for a first interval 1211, and may receive a response message after the first interval 1211 and before an interval (e.g., the sum of the second interval 1212 and the third interval 1213) in which a next data packet (e.g., Data2) is transmitted. For example, the interval (e.g., the second interval 1212 and the third interval 1213) in which a response message is received based on the Bluetooth legacy standard may correspond to one time slot (e.g., 625 ms). The user device 201 may retransmit the data packet for a fourth interval 1214 or transmit the next data packet based on the response message received for the second interval 1212 and the third interval 1213.

When it is identified that the first device 202-1 supports the resource control function, the user device 201 may divide the interval, in which the response message is received, by the number of devices receiving the data packet, thereby changing the time resource. For example, when there are two devices receiving the data packet, as illustrated in FIGS. 12A to 12C, the user device 201 may receive a first response message from the first device 202-1 for the second interval 1212 corresponding to a half (e.g., 0.3125 ms) of the time slot, and may receive a second response message from the second device 202-2 for the third interval 1213 corresponding to the remaining half FIGS. 12A to 12C illustrate an embodiment that the first device 202-1 transmits a response message for the second interval 1212. However, according to another embodiment, the second device 202-2 may transmit the response message for the second interval 1212, and the first device 202-1 may transmit the response message for the third interval 1213.

The user device 201 may transmit a next data packet (e.g., Data2) after reception of a plurality of response messages indicating an ACK is completed. For example, referring to FIG. 12A, when the first response message indicating the ACK is received for the second interval 1212, and the second response message indicating the ACK is received for the third interval 1213, the user device 201 may transmit a next data packet.

In another example, when at least one response message (e.g., a first response message) indicating a NACK among a plurality of response messages is received as illustrated in FIG. 12B, the user device 201 may retransmit the same data packet (e.g., Data1). As illustrated in FIG. 12C, when at least one response message (e.g., a first response message) of the plurality of response messages is lost, or the first device 202-1 fails to transmit a response message due to the failure of the reception of the data packet (e.g., Data 1), the user device 201 may retransmit the same data packet (e.g., Data 1).

When the size of the first response message transmitted from the first device 202-1 is greater than the size of the second interval 1212, the second device 202-2 may not transmit the second response message. In this case, the user device 201 may retransmit the same data packet (e.g., Data1) or may retransmit a next data packet (e.g., Data2).

The reception of response messages indicating the ACK may not be completed based on the restriction of the physical distance or the traffic. To prevent the delay time from being increased as the data packet is continuously retransmitted, the user device 201 may set a timer and may a next data packet (e.g., Data2) even if the reception of the response messages indicating the ACK is not completed when the set time is expired.

The first device 202-1 or the second device 202-2 may request the user device 201 to disable the resource control function based on the specified condition. For example, when the second link 215-1 between the first device 202-1 and the second device 202-2 is released, the reception state of the data packet is less than a threshold value, or the communication state of the first link 205 is less than the threshold value, the first device 202-1 or the second device 202-2 may request disabling the resource control function. When the request disabling the resource control function is received, the user device 201 may not divide the interval of receiving the response message.

When the second link 215-1 between the first device 202-1 and the second device 202-2 is released, the first device 202-1 or the second device 202-2 may transmit the response message multiple times instead of requesting disabling the resource control function. For example, the first device 202-1 may transmit a response message for the second interval 1212 and may transmit a response message for the third interval 1213.

Figure 13A:
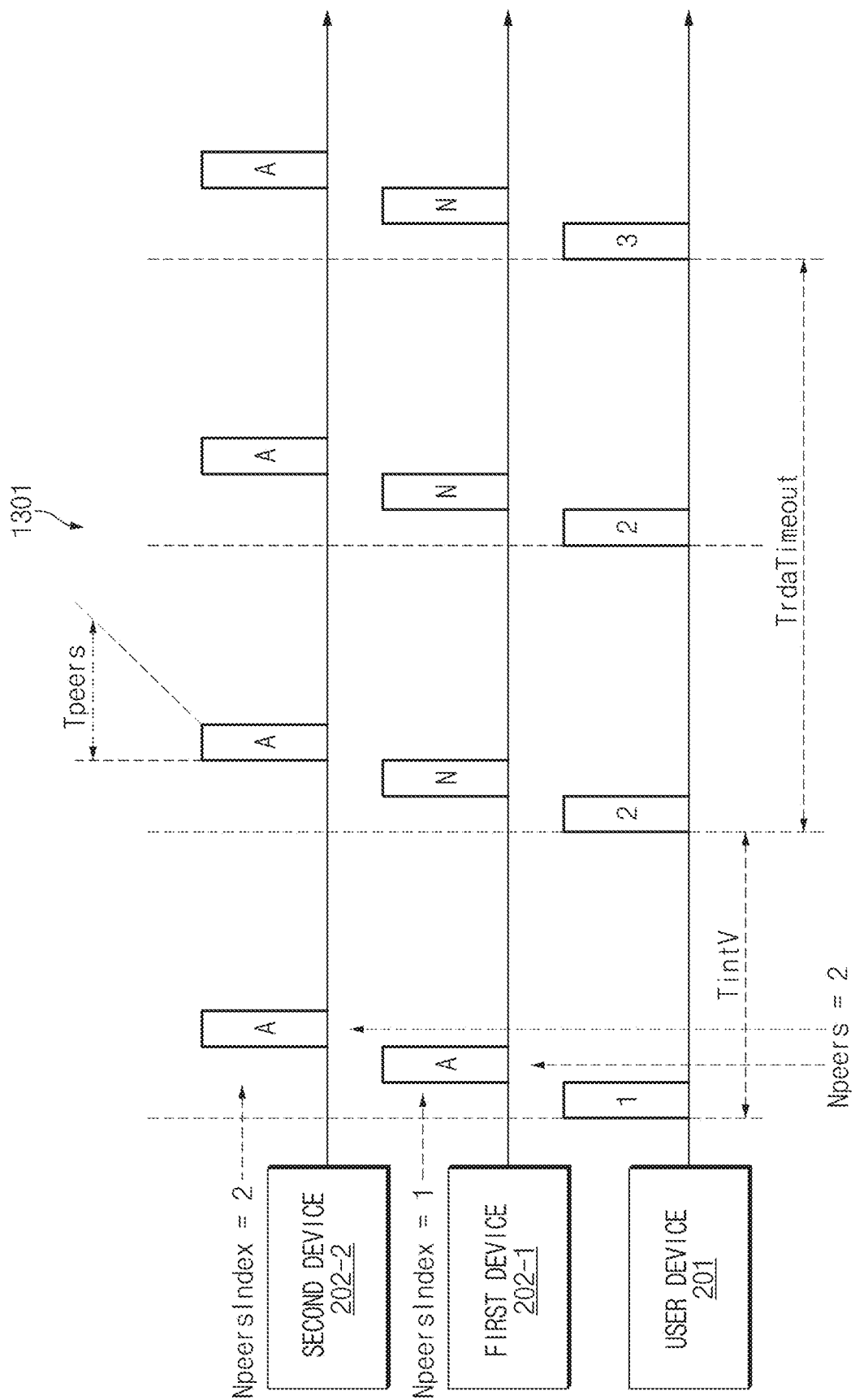
FIG. 13A illustrates an example of parameters for transmitting a data packet in a Bluetooth low energy (BLE) network, according to an embodiment of the disclosure.
Figure 13B:
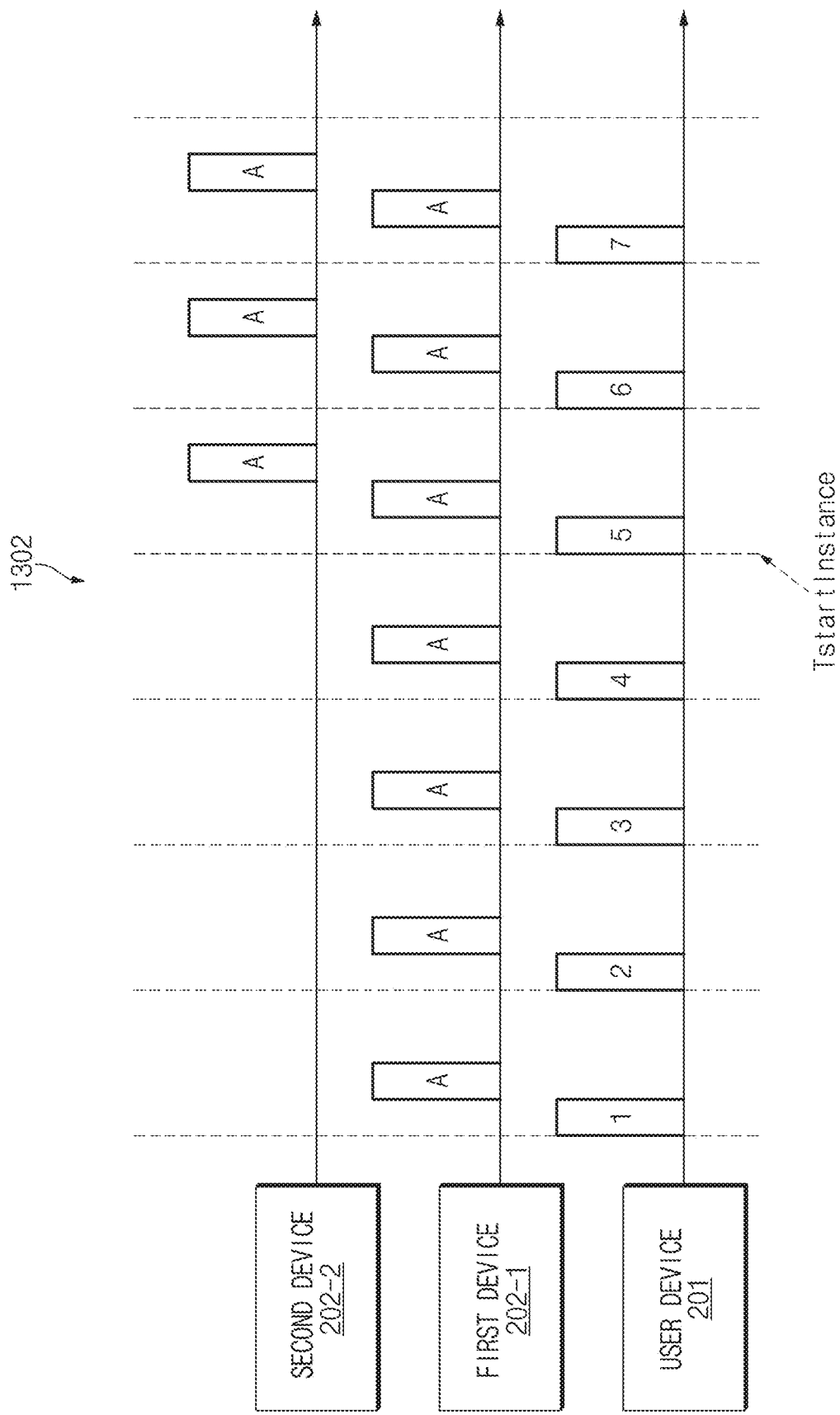
FIG. 13B illustrates another example of parameters for transmitting a data packet in a BLE network, according to an embodiment of the disclosure.
Figure 13C:
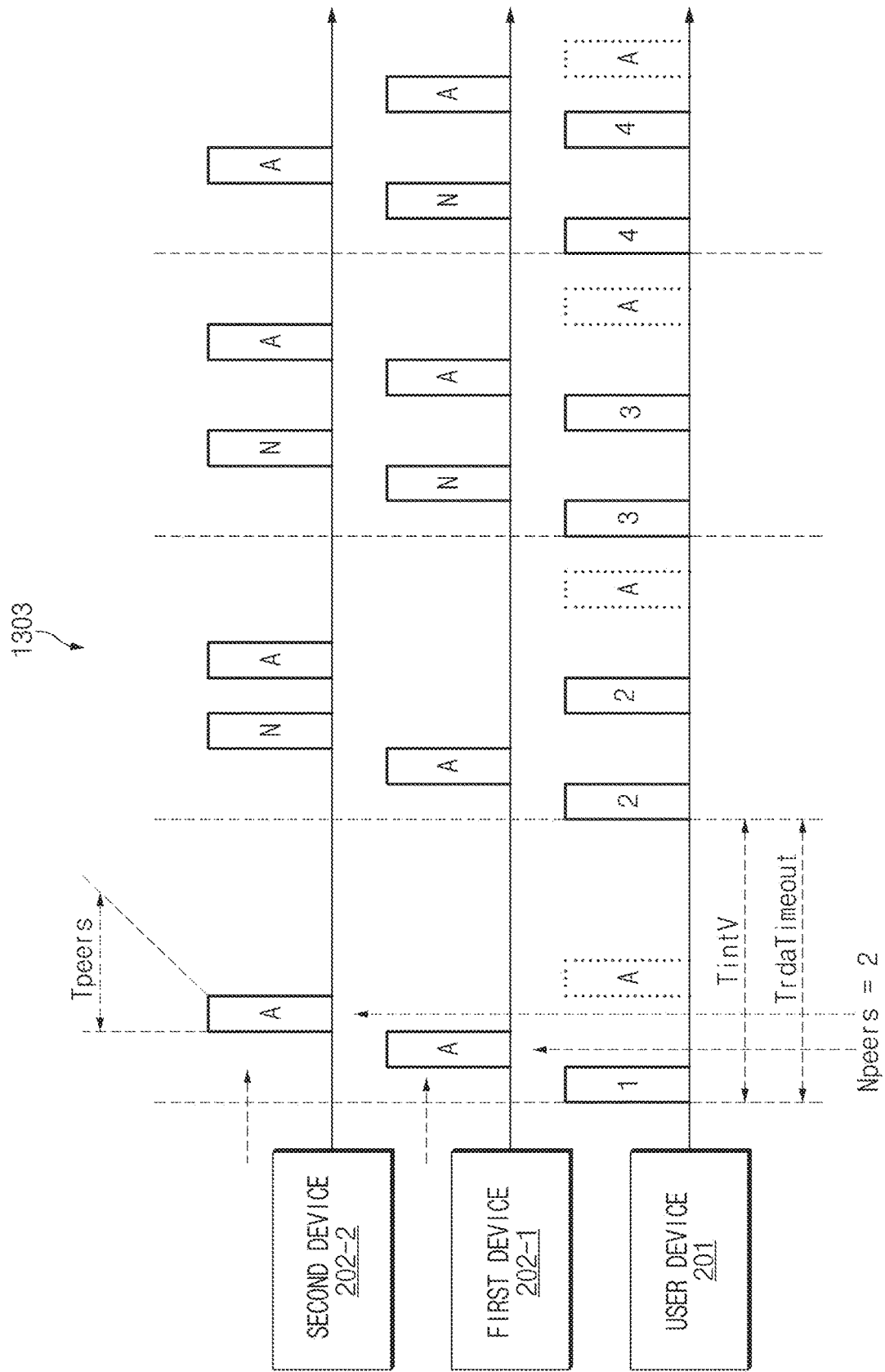
FIG. 13C illustrates the operation of transmitting a data packet based on parameters determined in the BLE network, according to an embodiment of the disclosure.

FIGS. 13A to 13C illustrate examples of parameters for transmission of a data packet in a BLE network according to various embodiments of the disclosure. FIGS. 13A to 13B illustrate parameters for transmission of a data packet, and FIG. 13C illustrates an operation of transmitting a data packet based on the parameters.

Referring to FIGS. 13A to 13C, the horizontal axes of graphs 1301, 1302, and 1303 indicate time. The user device 201, and the devices 202-1 and 202-2 may transmit data packets in specified size and specified number, based on an instance, an interval, and a sequence based on parameters defined in the BLE standard.

Referring to FIG. 13A, TintV may indicate an interval in which the user device 201 may transmit a data packet at least once. For example, the user device 201 may transmit a data packet for each interval indicated by TintV. The plurality of devices 202-1 and 202-2 may receive a data packet for "TintV" and may transmit a response message in response to the reception of the data packet. "Npeers" may indicate the number (e.g., two) of devices of receiving data packets from the user device 201. "Tpeers" may indicate the maximum amount (or the maximum time) of data (e.g., a response message) that each of the plurality of devices 202-1 and 202-2 transmits. "NpeersIndex" may indicate the sequence in which the plurality of devices 202-1 and 202-2 transmit the response message. For example, when the value of "NpeersIndex" of the first device 202-1 is 1, and the value of "NpeersIndex" of the second device 202-2 is 2, the first device 202-1 may first transmit the response message. "TrdaTimeout" may indicate an interval or frequency in which the first device 202-1 transmits the same data packet. For example, when transmitting data packet 2, and receiving a response message indicating "NACK" from the first device 202-1 or the second device 202-2, the user device 201 may retransmit data packet 2. In this case, when the interval or the frequency indicated by "TrdaTimeout" is expired after the data packet 2 is retransmitted, even though the response message indicating "NACK" is received from the first device 202-1, the user device 201 may transmit a next data packet (e.g., data packet 3) without transmitting the data packet 2.

Referring to FIG. 13B, the "Tstartinstance" may indicate a time point or instance at which the added device (e.g., the second device 202-2) may transmit a data packet. For example, when the second device 202-2 is added after the user device 201 transmits a specific data packet (e.g., data packet 1, 2, 3, or 4), the user device 201 and the first device 202-1 may determine the time point (e.g., the time point at which data packet 5 is transmitted) indicated by "Tstartinstance" through the negotiation procedure (e.g., the negotiation procedure 1110 of FIG. 11). The first device 202-1 may transmit "Tstartinstance" included in the information associated with the first link 205 to the second device 202-2. The second device 202-2 may transmit the response data to data transmitted to the first device 202-1 by the user device 201 from a time point indicated by "Tstartinstance".

Referring to FIG. 13C, when receiving data packet 1 from the user device 201, the first device 202-1 and the second device 202-2 may transmit a response message indicating "ACK". When the value indicated by "Npeers" is 2, and when two response messages are received, the user device 201 may transmit data packet 2 for a next interval of "TintV".

When at least one of the plurality of response messages indicates "NACK", the user device 201 may retransmit the same data packet for the interval indicated by "TintV". The user device 201 may determine whether to retransmit a data packet, based on the response message corresponding to the sequence (or time point) indicated by "NpeersIndex".

For example, when "NpeersIndex" of the first device 202-1 is 1 and "NpeersIndex" of the second device 202-2 is 2, and when the user device 201 receives a response message indicating "NACK" at the sequence (or time pint) in which NpeersIndex indicates "2", the user device 201 may retransmit the data packet. In this case, when the first device 202-1 receives a retransmitted data packet, the first device 202-1 may ignore the re-transmitted data packet.

In another example, when the user device 201 receives a response message indicating "NACK" at the time points in which "NpeersIndex" indicates 1 and indicates 2, the user device 201 may retransmit the data packet. In this case, the first device 202-1 and the second device 202-2 may transmit the response message to the data packet retransmitted based on the sequence indicated by "NpeersIndex".

The user device 201 may retransmit a data packet until the time (or the number of times) indicated by "TrdaTimeout" is elapsed.

As described above, an electronic device (e.g., the user device 201 of FIG. 2) may include a wireless communication circuitry (e.g., at least a portion of the wireless communication module 192 of FIG. 1) to support a Bluetooth network, at least one processor (e.g., the processor 120 of FIG. 1) operatively connected with the wireless communication circuitry, and a memory (e.g., the memory 130 of FIG. 1) operatively connected with the at least one processor. The memory may include instructions that, when executed, cause the at least one processor to create a link (e.g., the first link 205 of FIG. 2) with an external electronic device (e.g., the first device 202-1 of FIG. 2) based on the Bluetooth network, through the wireless communication circuitry, transmit a data packet including content to the external electronic device, through the wireless communication circuitry, identify whether the external electronic device supports a resource control function, receive at least one response message to the data packet through a first time resource, which is previously assigned, when the external electronic device does not support the resource control function, and receive a plurality of response messages to the data packet through a second time resource obtained by changing at least a portion of the first time resource, when the external electronic device supports the resource control function.

According to an embodiment of the disclosure, the instructions may cause the processor to transmit, to the external electronic device, a message for requesting resource control information associated with the resource control function, through the wireless communication circuitry, and receive a message including the resource control information from the external electronic device through the wireless communication circuitry.

According to an embodiment of the disclosure, the Bluetooth network may include a Bluetooth legacy network or a Bluetooth low energy (BLE) network, the request message may include a link manager protocol (LMP)_features_req message based on the Bluetooth legacy network or the BLE network, and the response message may include an LMP_features_res message based on the Bluetooth legacy network or the BLE network.

According to an embodiment of the disclosure, the Bluetooth network may include a Bluetooth legacy network. The instructions may cause the processor to transmit an identification (ID) packet based on the Bluetooth legacy network through the wireless communication circuitry, before creating the link, and receive an extended inquiry response (EIR) packet including resource control information associated with the resource control function from the external electronic device, through the wireless communication circuitry.

According to an embodiment of the disclosure, the resource control information may be included in an EIR data field of the EIR packet.

According to an embodiment of the disclosure, the instructions may cause the processor to divide a time slot for forming the first time resource by the number of devices to receive the data packet, when the external electronic device supports the resource control function, and receive the plurality of response messages through the divided time.

According to an embodiment of the disclosure, the Bluetooth network may include a BLE network, and the instructions may cause the processor to perform a negotiation procedure with the external electronic device based on the BLE network through the wireless communication circuitry, before transmitting the data packet, and receive resource control information associated with the resource control function from the external electronic device through the negotiation procedure.

According to an embodiment of the disclosure, the resource control information may include at least one parameter of TintV, Npeers, Tpeers, Tstartinstance, NpeersIndex, or TrdaTimeout based on the BLE network, the at least one parameter may be changed in the negotiation procedure based on the number of devices to receive the data packet, and the instructions may cause the processor to receive the plurality of response messages based on the at least one parameter changed in the negotiation procedure, when the external electronic device supports the resource control function.

As described above, an electronic device (e.g., the first device 202-1 of FIG. 2) may include a wireless communication circuitry (e.g., at least a portion of the wireless communication module 192 of FIG. 1) that supports a Bluetooth network, at least one processor (e.g., the processor 120 of FIG. 1), and a memory (e.g., the memory 130 of FIG. 1) operatively connected with the at least one processor. The memory may store instructions that, when executed, cause the at least one processor to, through the wireless communication circuitry, create a first link (e.g., the first link 205 of FIG. 2) with a first external electronic device (e.g., the user device 201 of FIG. 2) based on the Bluetooth network, transmit, to the first external electronic device, resource control information for changing a resource used to transmit a data packet, create a second link (e.g., the second link 215-1 of FIG. 2) with a second external electronic device (e.g., the second device 202-2 of FIG. 2) based on the Bluetooth network, transmit information associated with the first link to the second external electronic device, receive a data packet including content from the first external electronic device, and transmit a response message to the data packet to the first external electronic device through a second time resource obtained by changing at least a portion of a first time resource, which is previously assigned, based on the resource control information.

According to an embodiment of the disclosure, the information associated with the first link may include at least one of address information, clock information, or key information associated with the first link.

According to an embodiment of the disclosure, the Bluetooth network may include a Bluetooth legacy network, and the resource control information may include 1-bit information indicating whether the electronic device supports a resource control function.

According to an embodiment of the disclosure, the instructions may cause the processor to receive an ID packet based on the Bluetooth legacy network from the first external electronic device through the wireless communication circuitry, before creating the first link, and transmit an extended inquiry response (EIR) packet including the resource control information through the wireless communication circuitry, in response to receiving the ID packet.

According to an embodiment of the disclosure, the instructions may cause the processor to insert the resource control information in an EIR data field of the EIR packet.

According to an embodiment of the disclosure, the Bluetooth network may include a BLE network, and the resource control information may include at least one parameter of TintV, Npeers, Tpeers, Tstartinstance, NpeersIndex, or TrdaTimeout based on the BLE network.

According to an embodiment of the disclosure, the instructions may cause the processor to perform a negotiation procedure with the first external electronic device through the wireless communication circuitry, before receiving the data packet; and change at least a portion of the at least one parameter included in the resource control information, through the negotiation procedure.

As described above, an electronic device (e.g., the second device 202-2 of FIG. 2) may include a wireless communication circuitry (e.g., at least a portion of the wireless communication module 192 of FIG. 1) that supports a Bluetooth network, at least one processor (e.g., the processor 120 of FIG. 1), and a memory (e.g., the memory 130 of FIG. 1) operatively connected with the at least one processor. The memory may store instructions that, when executed, cause the at least one processor to, through the wireless communication circuitry, create a first link (e.g., the second link 215-1 of FIG. 2) with a first external electronic device (e.g., the first device 202-1 of FIG. 2) based on the Bluetooth network, receive, from the first external electronic device, information associated with a second link (e.g., the first link 205 of FIG. 2) formed between the first external electronic device and a second external electronic device (e.g., the user device 201 of FIG. 2), receive a data packet including content by monitoring the second link, based on at least a portion of the information associated with the second link, and transmit a response message for responding the data packet to the second external electronic device, based on the at least a portion of the information associated with the second link.

According to an embodiment of the disclosure, the information associated with the second link may include at least one of address information, clock information, or key information associated with the second link, and the instructions may cause the processor to determine a hopping channel of the second link through the address information and the clock information, and receive the data packet by monitoring the determined hopping channel, through the wireless communication circuitry.

According to an embodiment of the disclosure, the instructions may cause the processor to create an access code corresponding to the second link, based on the address information, and transmit the response message including the access code, through the wireless communication circuitry.

According to an embodiment of the disclosure, the Bluetooth network may include a Bluetooth legacy network, and the instructions may cause the processor to transmit the response message through at least a portion of a time slot based on the Bluetooth legacy network through the wireless communication circuitry.

According to an embodiment of the disclosure, the Bluetooth network may include a Bluetooth low energy (BLE) network, the information associated with the second link may include at least one parameter of TintV, Npeers, Tpeers, Tstartinstance, NpeersIndex, or TrdaTimeout based on the BLE network, and the instructions may cause the processor to transmit the response message based on the at least one parameter through the wireless communication circuitry.

The electronic device according to various embodiments disclosed herein may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used herein do not intend to limit technical features disclosed in the disclosure to a specific embodiment disclosed herein; rather, the disclosure should be construed to cover various modifications, equivalents, or alternatives of embodiments of the disclosure. With regard to the description of drawings, similar or related components may be assigned with similar reference numerals. In the disclosure disclosed herein, each of the wordings "A or B", "at least one of A and B", "at least one of A or B", "A, B, or C", "at least one of A, B, and C", or "at least one of A, B, or C", and the like used herein may include any one and all combinations of items arranged together in a relevant wording of the wordings. The expressions, such as "a first", "a second", "the first", or "the second", may be used merely for the purpose of distinguishing a component from another component, but do not limit the corresponding component in other aspect (e.g., the importance or the order). It is to be understood that if a component (e.g., a first component) is referred to, with or without the term "operatively" or "communicatively", as "coupled with," "coupled to," "connected with," or "connected to" the another component (e.g., a second component), it means that the component may be coupled with the another component directly (e.g., wiredly), wirelessly, or via a third component.

The term "module" used in the disclosure may include a unit implemented in hardware, software, or firmware and may be, for example, interchangeably used with the terms "logic", "logical block", "part" and "circuit". The "module" may be a minimum unit of an integrated part or may be a part thereof. The "module" may be an integral-type part, a minimum unit, which performs one or more functions, of the part, or a portion thereof. For example, according to an embodiment, the "module" may be implemented in the form of an application-specific integrated circuit (ASIC).

Various embodiments of the disclosure may be implemented by software (e.g., the program 140) including an instruction stored in a storage medium (e.g., an internal memory 136 or an external memory 138) readable by a machine (e.g., the electronic device 101). For example, the processor (e.g., the processor 120) of a machine (e.g., the electronic device 101) may call at least one instruction of stored instructions from the storage medium and execute the called instruction. This allows the machine to run to perform at least one function according to the at least one instruction, which is called. The one or more instructions may include a code generated by a compiler or a code executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

The method according to various embodiments disclosed herein may be provided as a part of a computer program product. The computer program product may be traded as goods between a seller and a buyer. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

Each component (e.g., the module or the program) of the above-described components may include one or plural entities. At least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. Operations performed by a module, a programming, or other components may be executed sequentially, in parallel, repeatedly, or in a heuristic method, or at least some operations may be executed in different sequences, omitted, or other operations may be added.

The electronic device may reduce unnecessary resource consumption and a delay time for data processing in the Bluetooth network environment.

In addition, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
wireless communication circuitry configured to support a Bluetooth network;
at least one processor operatively connected with the wireless communication circuitry; and
a memory operatively connected with the at least one processor,
wherein the memory stores instructions that, when executed, cause the at least one processor to:
create a link with an external electronic device based on the Bluetooth network, through the wireless communication circuitry,
transmit a data packet including content to the external electronic device, through the wireless communication circuitry,
identify whether the external electronic device supports a resource control function,
receive a first response message vindicating whether the external electronic device has received the data packet through a first time resource, which is previously assigned, when the external electronic device does not support the resource control function, and
receive a second response message indicating whether another external electronic device has received the data packet through a second time resource obtained by changing at least a portion of the first time resource, when the external electronic device supports the resource control function.

2. The electronic device of claim 1, wherein the instructions further cause the processor to:
transmit, to the external electronic device, a message for requesting resource control information associated with the resource control function, through the wireless communication circuitry, and
receive a message including the resource control information from the external electronic device through the wireless communication circuitry.

3. The electronic device of claim 2,
wherein the Bluetooth network includes a Bluetooth legacy network or a Bluetooth low energy (BLE) network,
wherein the request message includes a link manager protocol (LMP)_features_req message based on the Bluetooth legacy network or the BLE network, and
wherein the response message includes an LMP_features_res message based on the Bluetooth legacy network or the BLE network.

4. The electronic device of claim 1,
wherein the Bluetooth network includes a Bluetooth legacy network, and
wherein the instructions further cause the processor to:
transmit an identification (ID) packet based on the Bluetooth legacy network through the wireless communication circuitry, before creating the link, and
receive an extended inquiry response (EIR) packet including resource control information associated with the resource control function from the external electronic device, through the wireless communication circuitry.

5. The electronic device of claim 4, wherein the resource control information is included in an EIR data field of the EIR packet.

6. The electronic device of claim 4, wherein the instructions further cause the processor to:
divide a time slot for forming the first time resource by a number of devices to receive the data packet, when the external electronic device supports the resource control function, and
receive the second response message through the divided time slot.

7. The electronic device of claim 1,
wherein the Bluetooth network includes a BLE network, and
wherein the instructions cause the processor to:
perform a negotiation procedure with the external electronic device based on the BLE network through the wireless communication circuitry, before transmitting the data packet, and
receive resource control information associated with the resource control function from the external electronic device through the negotiation procedure.

8. The electronic device of claim 7,
wherein the resource control information includes at least one parameter of TintV, Npeers, Tpeers, Tstartinstance, NpeersIndex, or TrdaTimeout based on the BLE network,
wherein the at least one parameter is changed in the negotiation procedure based on a number of devices to receive the data packet, and
wherein the instructions further cause the processor to receive the second response message based on the at least one parameter changed in the negotiation procedure, when the external electronic device supports the resource control function.

9. An electronic device comprising:
wireless communication circuitry configured to support a Bluetooth network;
at least one processor; and
a memory operatively connected with the at least one processor,
wherein the memory stores instructions that, when executed, cause the at least one processor to, through the wireless communication circuitry:
create a first link with a first external electronic device based on the Bluetooth network,
transmit, to the first external electronic device, resource control information for changing a resource used to transmit a data packet,
create a second link with a second external electronic device based on the Bluetooth network,
transmit information associated with the first link to the second external electronic device,
receive a data packet including content from the first external electronic device, and
transmit a response message indicating whether the electronic device has received the data packet to the first external electronic device through a second time resource changed from at least a portion of a first time resource, which is previously assigned, based on the resource control information.

10. The electronic device of claim 9, wherein the information associated with the first link includes:
at least one of address information, clock information, or key information associated with the first link.

11. The electronic device of claim 9,
wherein the Bluetooth network includes a Bluetooth legacy network, and wherein the resource control information includes 1-bit information indicating whether the electronic device supports a resource control function.

12. The electronic device of claim 11, wherein the instructions further cause the processor to:
receive an ID packet based on the Bluetooth legacy network from the first external electronic device through the wireless communication circuitry, before creating the first link, and
transmit an extended inquiry response (EIR) packet including the resource control information through the wireless communication circuitry, in response to receiving the ID packet.

13. The electronic device of claim 12, wherein the instructions further cause the processor to:
insert the resource control information in an EIR data field of the EIR packet.

14. The electronic device of claim 9,
wherein the Bluetooth network includes a BLE network, and
wherein the resource control information includes at least one parameter of TintV, Npeers, Tpeers, Tstartinstance, NpeersIndex, or TrdaTimeout based on the BLE network.

15. The electronic device of claim 14, wherein the instructions further cause the processor to:
perform a negotiation procedure with the first external electronic device through the wireless communication circuitry, before receiving the data packet; and
change at least a portion of the at least one parameter included in the resource control information, through the negotiation procedure.

16. An electronic device comprising:
wireless communication circuitry configured to support a Bluetooth network;
at least one processor; and
a memory operatively connected with the at least one processor,
wherein the memory stores instructions that, when executed, cause the at least one processor to, through the wireless communication circuitry:
create a first link with a first external electronic device based on the Bluetooth network,
receive, from the first external electronic device or an external server, information associated with a second link formed between the first external electronic device and a second external electronic device,
receive a data packet including content by monitoring the second link, based on at least a portion of the information associated with the second link, and
transmit a response message indicating whether the electronic device has received the data packet to the second external electronic device through a second time resource changed, by the second external electronic device, from at least a portion of a first time resource which is previously assigned for transmitting the data packet, based on the at least a portion of the information associated with the second link.

17. The electronic device of claim 16,
wherein the information associated with the second link includes at least one of address information, clock information, or key information associated with the second link, and
wherein the instructions further cause the processor to:
determine a hopping channel of the second link through the address information and the clock information, and
receive the data packet by monitoring the determined hopping channel, through the wireless communication circuitry.

18. The electronic device of claim 17, wherein the instructions further cause the processor to:
create an access code corresponding to the second link, based on the address information, and
transmit the response message including the access code, through the wireless communication circuitry.

19. The electronic device of claim 16,
wherein the Bluetooth network includes a Bluetooth legacy network, and
wherein the instructions further cause the processor to transmit the response message through at least a portion of a time slot based on the Bluetooth legacy network through the wireless communication circuitry.

20. The electronic device of claim 16,
wherein the Bluetooth network includes a Bluetooth low energy (BLE) network,
wherein the information associated with the second link includes at least one parameter of TintV, Npeers, Tpeers, Tstartinstance, NpeersIndex, or TrdaTimeout based on the BLE network, and
wherein the instructions further cause the processor to transmit the response message based on the at least one parameter through the wireless communication circuitry.

* * * * *